United States Patent
Chhabra et al.

(10) Patent No.: US 11,343,090 B2
(45) Date of Patent: May 24, 2022

(54) DEVICE ID FOR MEMORY PROTECTION

(71) Applicant: Intel Corporation, Santa Clara, CA (US)

(72) Inventors: Siddhartha Chhabra, Portland, OR (US); Prashant Dewan, Portland, OR (US)

(73) Assignee: Intel Corporation, Santa Clara, CA (US)

(*) Notice: Subject to any disclaimer, the term of this patent is extended or adjusted under 35 U.S.C. 154(b) by 215 days.

(21) Appl. No.: 16/454,476

(22) Filed: Jun. 27, 2019

(65) Prior Publication Data
US 2019/0319789 A1    Oct. 17, 2019

(51) Int. Cl.
*H04L 9/08* (2006.01)
*G06F 21/85* (2013.01)
*G06F 21/78* (2013.01)

(52) U.S. Cl.
CPC ............ *H04L 9/0866* (2013.01); *G06F 21/78* (2013.01); *G06F 21/85* (2013.01)

(58) Field of Classification Search
CPC ....... H04L 9/08666; G06F 21/78; G06F 21/85
See application file for complete search history.

(56) References Cited

U.S. PATENT DOCUMENTS

| | | |
|---|---|---|
| 2014/0282819 A1 | 9/2014 | Sastry et al. |
| 2017/0083724 A1 | 3/2017 | Chhabra et al. |
| 2019/0044729 A1 | 2/2019 | Chhabra et al. |
| 2019/0095351 A1 | 3/2019 | Chhabra et al. |
| 2019/0182040 A1* | 6/2019 | Hunt .................... H04L 9/0894 |

FOREIGN PATENT DOCUMENTS

| | | |
|---|---|---|
| CN | 112148210 A | 12/2020 |
| EP | 3757857 A1 | 12/2020 |
| WO | 2019066918 A1 | 4/2019 |

OTHER PUBLICATIONS

European Extended Search Report in European Patent Application No. 20164733.6 dated Sep. 18, 2020, 9 pages.

* cited by examiner

*Primary Examiner* — Hee K Song
(74) *Attorney, Agent, or Firm* — Patent Capital Group

(57) ABSTRACT

There is disclosed in one example a computing system, including: a processor; a memory; and a memory encryption engine (MEE) including circuitry and logic to: allocate a protected isolated memory region (IMR); encrypt the protected IMR; set an access control policy to allow access to the IMR by a device identified by a device identifier; and upon receiving a memory access request directed to the IMR, enforce the access control policy.

18 Claims, 20 Drawing Sheets

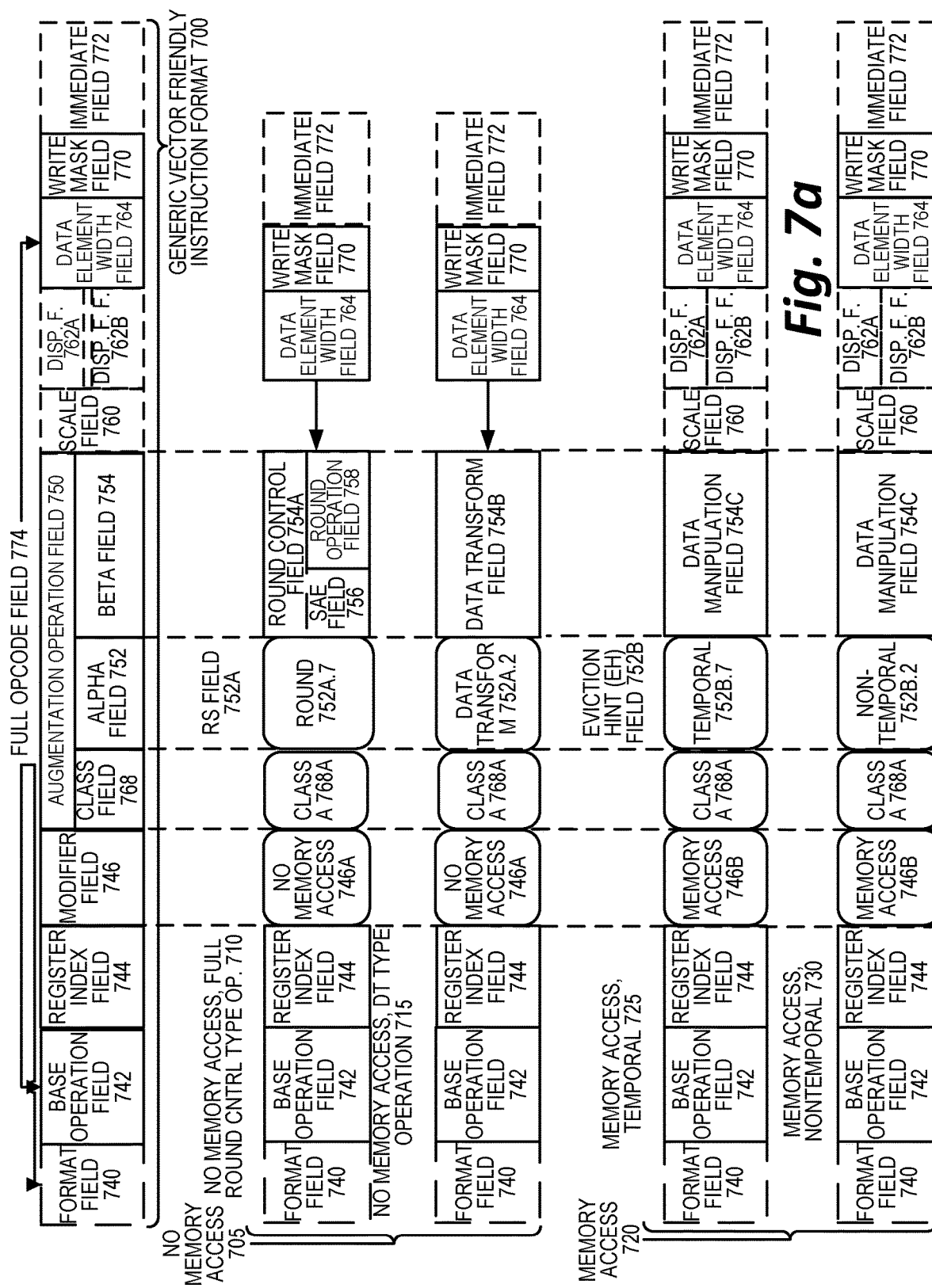

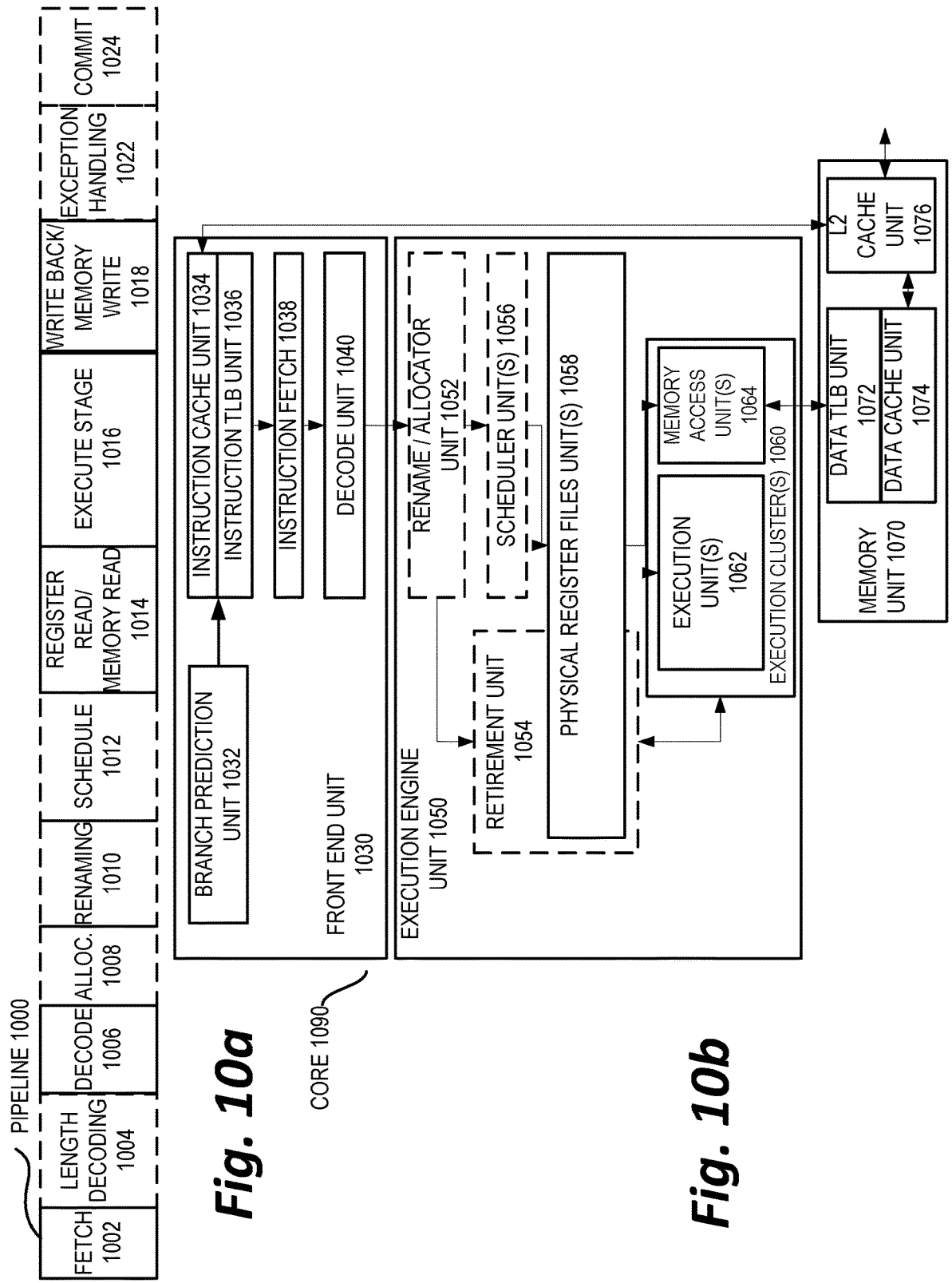

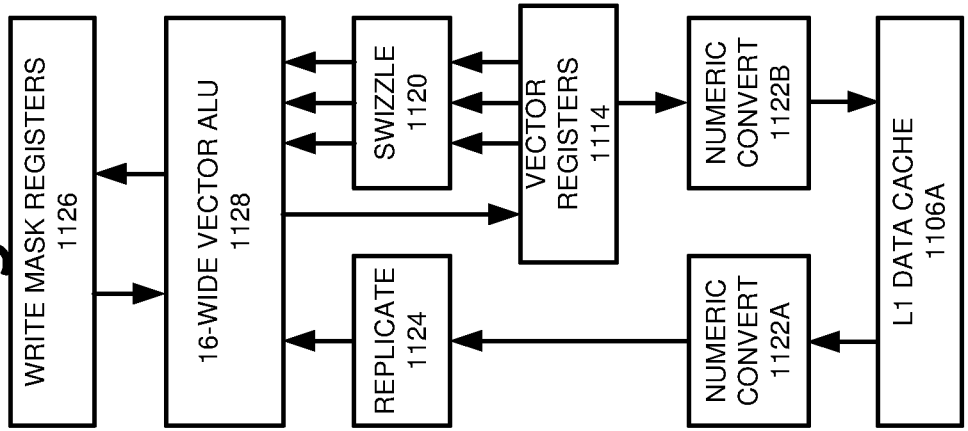
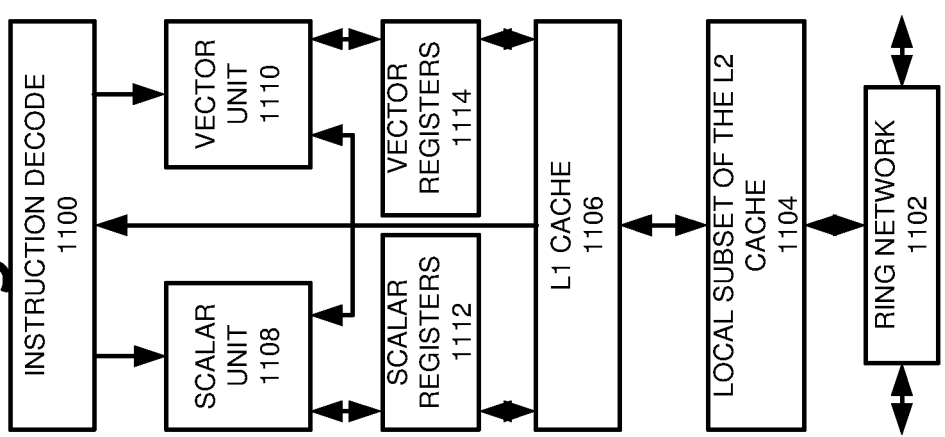

DEVICE ID FOR MEMORY PROTECTION

FIELD OF THE SPECIFICATION

This disclosure relates in general to the field of computer security, and more particularly, though not exclusively, to a system and method of providing a device identification for memory protection.

BACKGROUND

In the modern world, compute resources play an ever more integrated role with human lives. As computers become increasingly ubiquitous, controlling everything from power grids and large industrial machines to desktop workstations and light bulbs, computer security is a premium concern in many contexts.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

FIGS. 7a-7b are block diagrams illustrating a generic vector-friendly instruction format and instruction templates thereof according to one or more examples of the present specification.

FIG. 10a is a block diagram illustrating both an example in-order pipeline and an example register renaming an out-of-order issue/execution pipeline according to one or more examples of the present specification.

FIG. 10b is a block diagram illustrating both an example of an in-order architecture core and an example register renaming an out-of-order issue/execution architecture core to be included in a processor according to one or more examples of the present specification.

FIGS. 11a-11b illustrate a block diagram of a more specific in-order core architecture, which core would be one of several logic blocks (including other cores of the same type and/or different types) in a chip according to one or more examples of the present specification.

EMBODIMENTS OF THE DISCLOSURE

Figure 1:
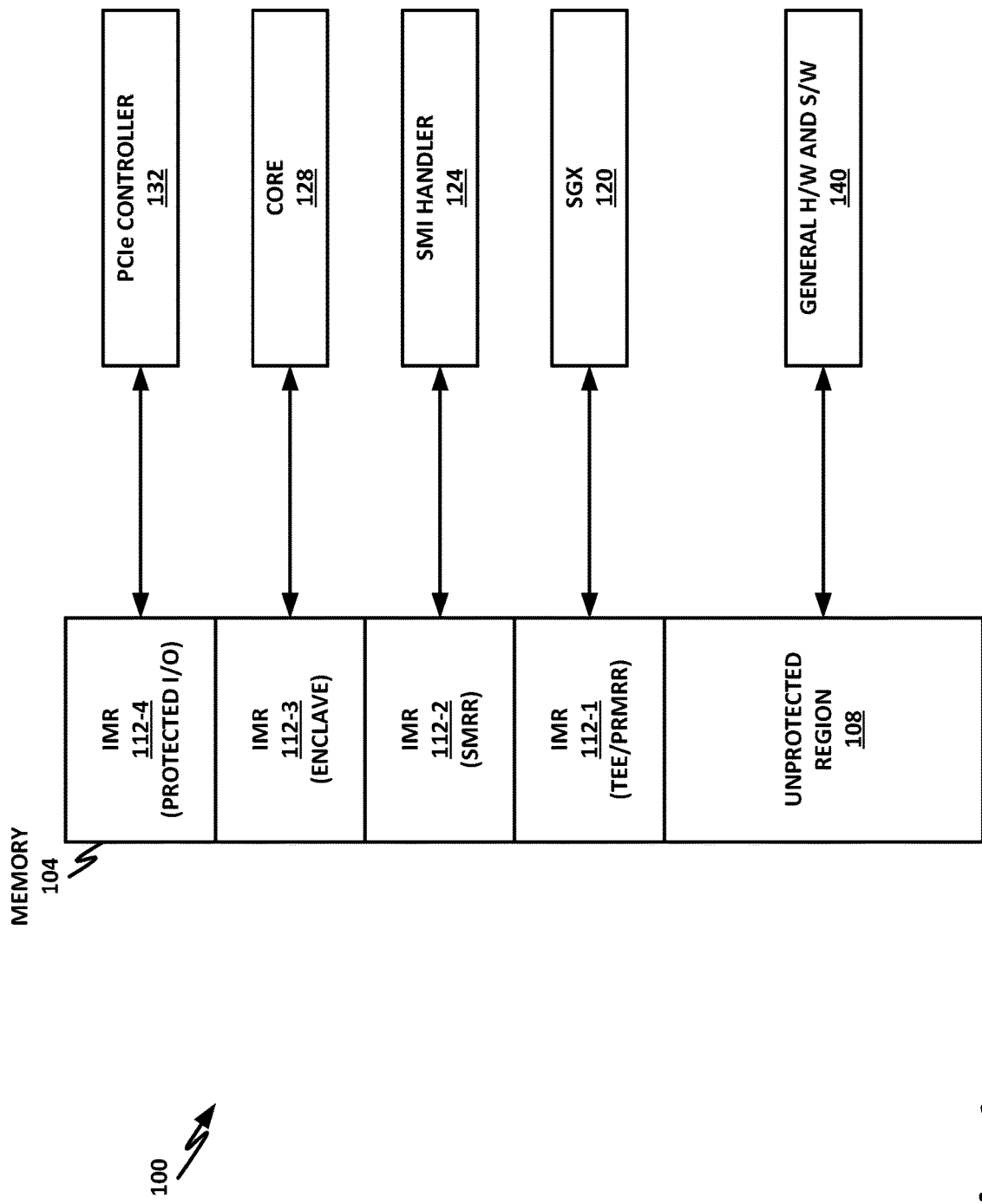
FIG. 1 is a block diagram of a distributed enforcement mechanism for an encrypted memory region.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Modern computing workloads demand security mechanisms that go far beyond traditional security paradigms, such as old UNIX mainframes. In that context, a number of users may have had accounts on the system, and security consisted of a simple authentication mechanism wherein a user supplied a username and password, and was authenticated. Such systems have rudimentary access controls, for example by applying certain permissions to files and directories within a file system.

As computing has evolved, so has the nature of security threats. For example, in a modern cloud data center, a large number of tenants in the multitenant data center may execute their own separate workloads on the same physical hardware. Although these workloads are logically separated, some modern sophisticated attacks, such as side channel attacks that exploit cache loading and branch misprediction, are able to access data that they should not access.

Enhanced security can be provided by trusted environments, such as multi-key total memory encryption (MKTME), which encrypts the entire memory of a device. When the memory is encrypted, even if an attacker can gain access to an unauthorized memory location, without the proper message authentication code (MAC), the compromised data are useless to the attacker.

Even in single-user devices, such as laptops, desktops, tablets, smartphones, or other similar devices, a trusted execution environment (TEE) may be provided to handle especially sensitive workloads or security functions. A TEE may interface with a memory encryption engine (MEE) that may not necessarily be an MKTME, but that is referred to in this specification as a "partial scope MEE." As used throughout this specification, an MEE should be understood broadly to include an MEE that provides either total memory encryption (such as in the case of an MKTME), or one that encrypts only portions of the memory (as in the case of a "partial scope MEE").

An enforcement mechanism for an encrypted memory may include identifying an isolated memory region (IMR), which may cover, for example, a defined range of memory with a defined beginning address and ending address. One or more authorized devices, which may be identified by one or more device identifiers (or device IDs), may be authorized to access the IMR memory range. A proper access control policy may, for each memory access directed to the IMR range, identify a device ID associated with the memory access request, determine whether the device ID matches the device ID of a device authorized to access the IMR range, and enforce the policy, either by allowing access in the case of a match, or by disallowing access in the case of a mismatch.

One possible implementation includes a number of different devices, each of which provide their own access control policy to the IMR. For example, a system may have several isolation regions in memory for its security. Examples of such regions include IMRs for a TEE, a processor reserved memory range register (PRMRR) for protecting Intel® Software Guard Extensions (SGX) code and data, a system management mode range register (SMRR) for protecting SMM code and data, and graphics stolen memory to provide isolated memory to graphics.

A hardware platform providing these protections ultimately needs to implement the desired protection for each of the ranges as required by the security architecture in each context.

To provide the desired protection for the various ranges, the hardware platform could implement protection at various places in the platform. For example, PRMRR protection may be implemented in the core (to prevent unauthorized core access), in an input/output (I/O) port (to prevent unauthorized I/O access), and in a graphics driver (to prevent unauthorized access from graphics).

However, this duplication of access control at multiple places may result in an increased hardware trusted compute base (TCB), validation, and design complexity. This can increase the likelihood of security bugs.

Other embodiments may take advantage of the fact that systems with protected memory generally already include an MEE. The MEE sits on the memory path, and thus provides a useful place for monitoring all memory accesses. In at least some embodiments of the present specification, centralized access control is implemented in the MEE (e.g., a partial scope MEE, an MKTME, or other similar MEE) with trusted agents for a particular range identified for each IMR. Protection policies for the encryption engine may be programmed in various different ways. For example, a new instruction set architecture instruction, which may in some cases be implemented in microcode, may be provided. When this instruction is used, software programming can simply execute the instruction and generally assume that the instructed policy has been carried out. In other examples, memory policy registers may be provided by which, for example, a trusted agent can populate the registers with the appropriate data, such as an address range for an IMR and a single agent ID, a plurality of agent IDs, or a range of agent IDs authorized to access the memory range. In some cases, these registers are not directly programmable by software. In those cases, an application programming interface (API) or other interface, such as a memory mapped I/O (MMIO) interface may be provided by the MEE, itself. Using this interface, a system programmer can program the appropriate access controls into the registers, and the policy is set within the MEE.

In some embodiments, a fabric, such as an on-die interconnect, intercore interconnect, uncore fabric, or other fabric or interconnect may be made source ID aware to enable propagation of source IDs along with memory access requests. In various embodiments, the source ID may be transmitted serially (e.g., as a data packet) or in parallel as a number of bus lines for the source ID. For example, if the source ID is a 16-bit source ID, then an additional 16 conductors may be added to the uncore fabric or other on-chip fabric to carry the additional source ID information.

Note, however, that the addition of these bus lines is not practical in every application. For example, devices may need to communicate over existing, well-defined standards-compliant buses. To provide just one example, peripheral component interconnect express (PCIe) is a popular standard for adding peripheral devices to a computing system. The PCIe bus may include peripherals for everything from human interface and I/O devices for a standalone user system, to high speed hardware accelerators in a data center. Access control from these devices may need to be provided in addition to access control for devices located on an integrated circuit or system-on-a-chip (SoC).

In some embodiments, it may be more practical to maintain the existing standards-compliant PCIe bus, rather than trying to add new trace lines to the bus. In that case, a PCIe controller may need to be modified with additional logic to receive the device ID for security purposes. In one illustrative example, the device ID may be transmitted as or within a transaction layer protocol (TLP) packet header. Thus, the PCIe controller may need a TLP prefix processing module that is capable of extracting the appropriate device ID from the TLP prefix, which is received on a standards-compliant PCIe bus, and then translating that into parallel data that are transmitted via the device ID bus lines of an on-die fabric.

In one illustrative embodiment, the device ID is a 16-bit device identifier, which provides a total of 65,536 possible device IDs in a system. This 16-bit device ID is disclosed by way of illustrative and nonlimiting example, and other device ID widths may be used. For example, a device ID could be 2, 4, 6, 8, 12, 16, 24, 32, 48, 64, or 128 bits, by illustrative and nonlimiting example. Furthermore, while in this embodiment the device ID is treated as a binary unsigned integer, other representations are also possible. For example, in a system where it is known a priori that there are only 16 possible devices, or where there are 16 known enumerated devices, then a 16-bit device ID could be treated as a field of 16 flags, with each flag indicating a discrete device that is interested in the memory access. This could be useful in an example where more than one device may need to access a memory location at the same time. For example, there may be a case where multiple discrete devices need to read the value from a memory location on the same memory cycle, in which case the flags for each of those devices could be set, and the MEE could ensure that all of the devices that are flagged are permitted to access the memory location.

This new device ID and its associated transport mechanisms are necessary in some embodiments because the memory access policy control has been centralized to the MEE. In other embodiments with distributed methods of access control, the duplicated access enforcement logic on each device inherently knows the source of the memory access request that it receives. For example, access control logic in the graphics engine knows that accesses through it originated from the graphics engine as the source. With centralized access control, it may be necessary to carry an identifier of the source originating a memory transaction through to the MEE, and possibly on through to the memory controller. Thus, embodiments of the present specification introduce a source aware fabric (SAF) that allows enforcement of these protections in a centralized manner, via the MEE.

This enables centralizing access control by leveraging the advantageous position of the MEE, further reducing hardware TCB, validation, and design complexity, which also decreases the likelihood of security bugs. Overall, the centralized access policy of the present specification provides higher assurance. This is enabled by the use of an SAF and instruction set architecture (ISA) support to program the access policies to the central access control enforcement logic within the MEE.

An embodiment of the present specification may usefully be divided into three components.

First, a new access control engine is provided within the MEE, which may be a partial scope MEE, an MKTME, or any other similar MEE. The access engine implements access policies for desired platform resources and memory ranges. The trusted agents responsible for programming ranges on existing platforms may program the range and policy information to the encryption engine, and thereafter lock and/or verify the policy before allowing feature launch.

Second, an SAF is provided to provide source information on the fabric. The access policy for a particular resource is programmed as a set of source identifiers allowed to access the resource. This requires each initiator or a group of initiators to be associated with one or more source identifiers, or a range of source identifiers. The policy register may be programmed using a new ISA instruction herein referred to as "SET_POLICY," although it should be understood that the name SET_POLICY is provided as an illustrative example only. To fall within the scope of the specification and the claims, an architecture need not use the name SET_POLICY, but may provide a different name for a register that provides the same or a similar function. In other embodiments, MMIO access may be used as required by the resource security architecture. As an example, PRMRR is programmed by microcode, whereas SMRR can be programmed using the MMIO by system software.

Third, ISA support is provided for programming policies. A new instruction is provided in one embodiment to program policy information to the encryption engine. This is useful for embodiments (e.g., Intel® SGX) which do not include system software in their TCB.

A system and method for providing a device ID for memory protection will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a block diagram of a distributed enforcement mechanism for an encrypted memory region. In the example of FIG. 1, memory 104 optionally includes an unprotected region 108, for example, in the case of a partial scope MEE. Unprotected region 108 is accessible by general hardware and software 140.

Memory 104 is also divided into a plurality of IMRs 112. Each IMR has a distinct purpose in this illustration. For example, IMR 112-1 is a PRMRR allocated as a TEE enclave for trusted compute operations. IMR 112-1 is managed by a core via special instructions such as Intel® Software Guard Extensions (SGX) 120.

IMR 112-2 is an SMRR region, and in this illustration is managed by an SMI handler 124.

IMR 112-3 is a different memory enclave, and is managed by core 128.

IMR 112-4 is a protected I/O memory region or address space, and is managed by PCIe controller 132.

In this configuration, SGX 120, SMI handler 124, core 128, and PCIe controller 132 all provide their own memory management and security functions. These functions are duplicated across the various devices, thus increasing the probability of a programming error and/or security aperture in one of these devices. Note that in this configuration, there is no need for an SAF, because each device inherently knows the source of a memory access request.

Figure 2:
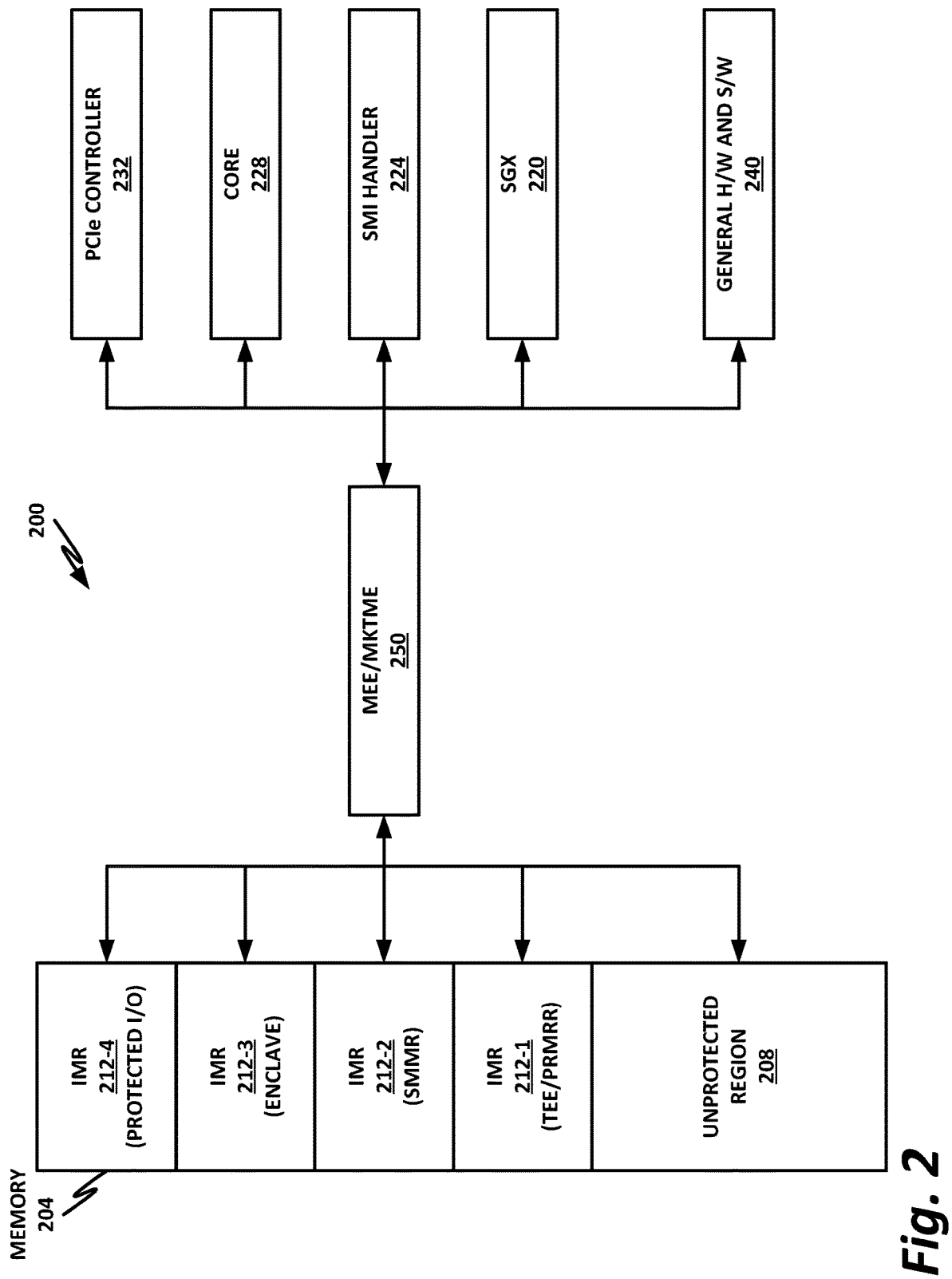
FIG. 2 is a block diagram illustrating a unified source ID-based memory access system.

FIG. 2 is a block diagram of a system 200, illustrating a unified source ID-based memory access system. In this example, as before, an unprotected region 208 is optionally provided for access by general hardware and software 240. Furthermore, an IMR 212-1 provides a PRMRR TEE accessible via SGX 220. IMR 212-2 is for SMRR, and is accessible by SMI handler 224. IMR 212-3 is a memory enclave accessible by core 228. IMR 212-4 is a protected I/O region, and is accessible by PCIe controller 232.

In this embodiment, the memory access control features may be uniformly provided by MEE 250, which in various embodiments could be a partial scope MEE, an MKTME, or any other suitable MEE. The interconnects illustrated in this FIGURE may be considered a fabric, and in some embodiments, at least as between PCIe controller 232, core 228, SMI handler 224, SGX 220, and general hardware and software 240 on the one hand and MEE/MKTME 250 on the other hand, the fabric may be an SAF. For example, the fabric may include additional bus lines, such as 16 additional bus lines for a 16-bit source ID, which carries the source ID information between the various devices.

Figure 3:
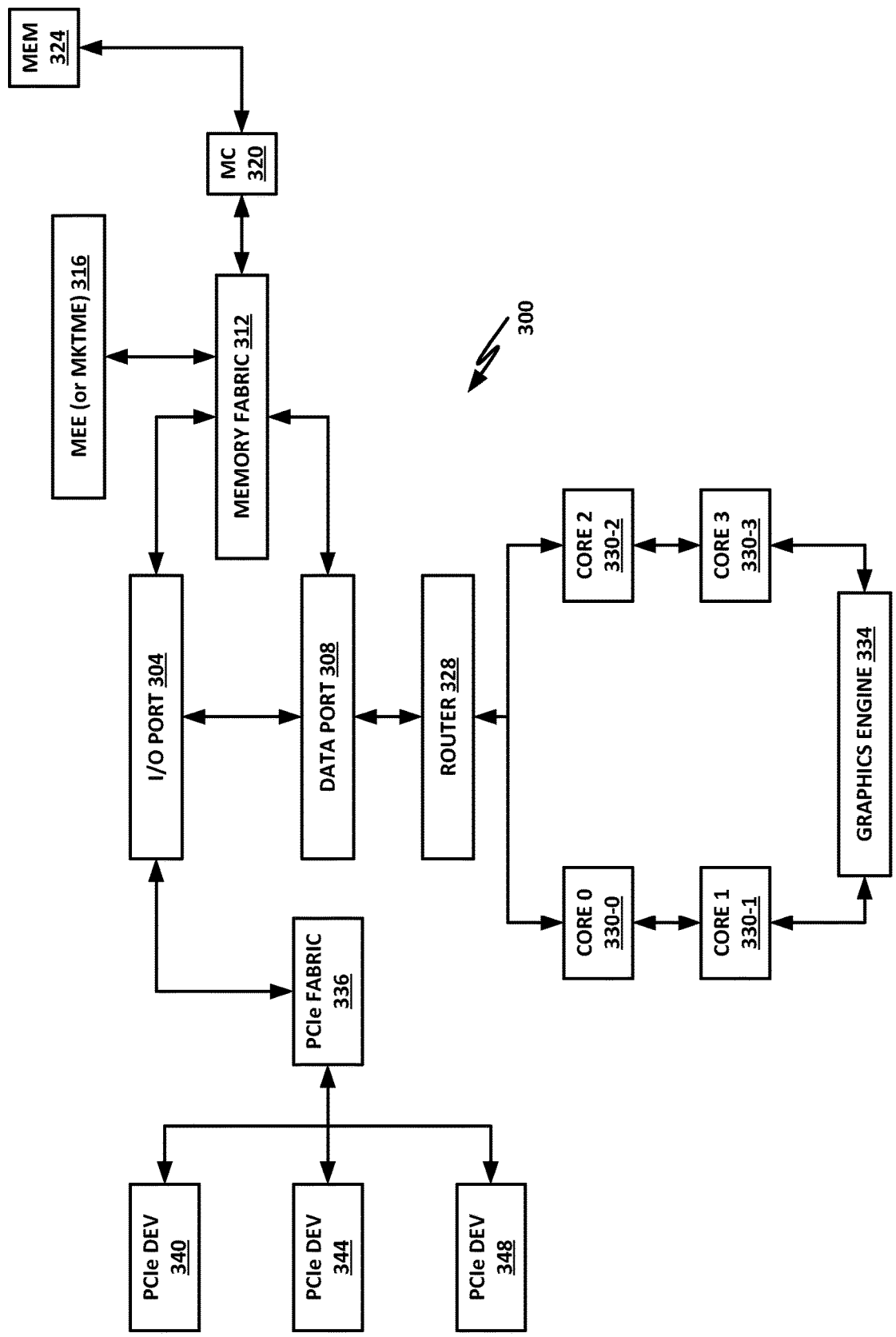
FIG. 3 is a block diagram of a system illustrating selected aspects of an illustrative architecture.

FIG. 3 is a block diagram of a system 300 illustrating selected aspects of an illustrative architecture. In this example, system 300 includes a processor or processors including four cores. Included in the example of FIG. 3 are core 0 330-0, core 1 330-1, core 2 330-2, and core 3 330-3. Cores 330 connect to a graphics engine 334, while a router 328 routes data to the various cores 330.

A data port 308 sends and receives data to other parts of the system. Data port 308 may be considered part of the uncore.

An I/O port 304 also communicatively couples to data port 308, and may provide I/O services, including networking, human interface devices, and other input/output. I/O port 304 communicatively couples to a PCIe fabric 336, which may include a PCIe controller. In this example, three PCIe devices, namely PCIe device 340, PCIe device 344, and PCIe device 348 couple to the system via PCIe fabric 336.

A memory fabric 312 communicatively couples to data port 308 and I/O port 304. Memory fabric 312 also communicatively couples the system to an MEE 316, which could be a partial scope MEE, an MKTME, some other total memory encryption controller, or other MEE.

Memory fabric 312 couples MEE 316 to memory controller 320, which ultimately couples to memory 324.

In this illustrative example, memory fabric 312 may be an SAF, meaning it may include additional bus lines to carry source ID information between the various points. Furthermore, interconnects between cores 330, GEN 334, router 328, data port 308, I/O port 304, and PCIe fabric 336 may also include additional bus lines to carry the source ID information. Interconnects from PCIe fabric 336 could carry such bus lines, but in another embodiment, could be a standard PCIe fabric without the additional bus lines. In that case, the data may be provided in a data packet, such as in a TLP prefix, and may be converted by the PCIe controller into parallel data on the SAF.

Figure 4:
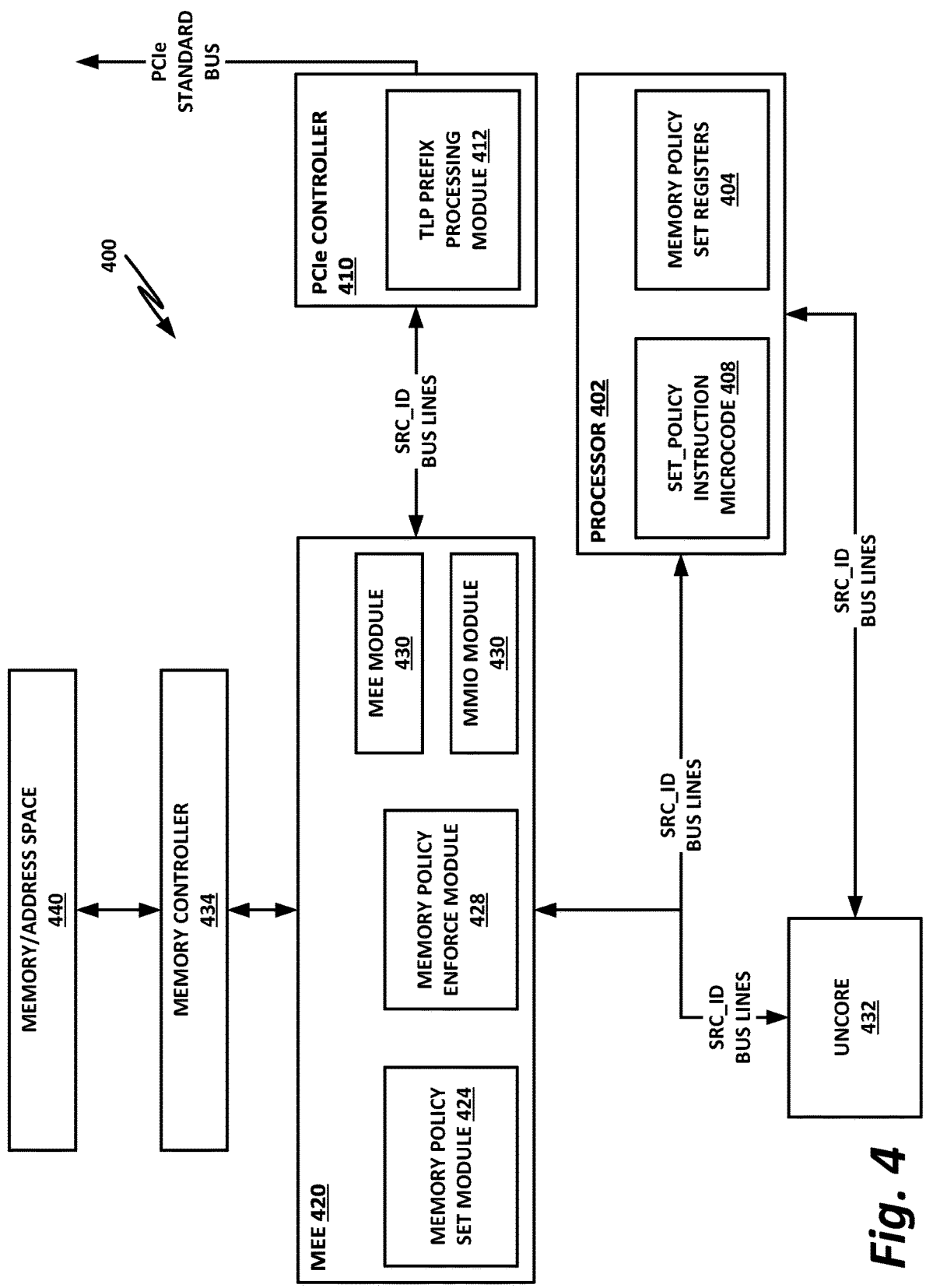
FIG. 4 is a block diagram illustrating additional selected elements of a system configured to provide memory access control policies.

FIG. 4 is a block diagram illustrating additional selected elements of a system 400 configured to provide memory access control policies. In this example, a processor 402 includes memory policy set registers 404, as well as a SET_POLICY instruction microcode 408. Note that the SET_POLICY instruction is provided here as a nonlimiting example, and that an architecture designer could give the instruction any suitable name. Furthermore, while in this example the SET_POLICY instruction is illustrated as being in microcode, in other embodiments it could be in hardware instructions, or loaded from firmware, software, or some other source. The SET_POLICY instruction microcode provides an instruction for a trusted agent to program a memory access policy, including, for example, a memory range and one or more device IDs entitled to access the memory range.

The memory policy set registers 404 may be part of the standard register file as illustrated in other FIGURES herein, and may be used to program a memory access policy. In some cases, memory policy set registers 404 are not directly software-accessible, but may be accessible via, for example, MMIO module 430 of MEE 420. In some embodiments, the policy is at least partly hardcoded (e.g., PRMRR access to only SGX enclaves), or is provided by system software (e.g., SMRR access policy). In the first case, a new SET_POLICY instruction may be used to set the policy in the centralized access control engine. In the second case system software can program the policy directly using MMIO.

Processor 402 communicatively couples with an uncore 430 via an SAF. The interconnect between uncore 430 and MEE 420 is also an SAF, as is the interconnect between processor 402 and MEE 420, and between PCIe controller 410 and MEE 420.

In this example, PCIe controller 410 connects via a standard PCIe bus to PCIe devices. This PCIe bus may lack an SAF, and thus source IDs may need to be transmitted serially, for example, as part of a data packet. In one example, the source ID is transmitted as part of a TLP prefix, and PCIe controller 402 includes a TLP prefix processing module 412. TLP prefix processing module 412 receives the serialized source ID as part of a TLP prefix packet, and converts this into parallel data that may be transmitted via the SAF to MEE 420.

MEE 420 includes an MMIO module 430, which among other things may be used to program memory policy set registers 404 in certain embodiments. In other embodiments, an MMIO module 430 may be provided, but may not be used for this purpose.

MEE 420 also includes a memory policy set module 424 and a memory policy enforce module 428. For reference, memory policy set module 424 and memory policy enforce module 428 may be referred to collectively as a memory access control engine. Memory policy set module 424 includes circuitry and logic by which a memory access policy can be set. This can include circuitry and logic to communicatively couple with processor 402, and receive from processor 402 instructions on programming a memory access policy. Memory policy set module 424 may also include or couple with MMIO module 430, in which case it may also provide a mechanism for a trusted agent to interface with MEE 420 and program the memory access policy. Memory policy enforce module 428 can include circuitry and logic to enforce the memory access control policy once it has been set and verified.

MEE 420 communicates via a memory fabric with memory controller 434, which interfaces to a memory and/or address space 440 to carry out memory access operations, as authorized and enabled by MEE 420.

Figure 5:
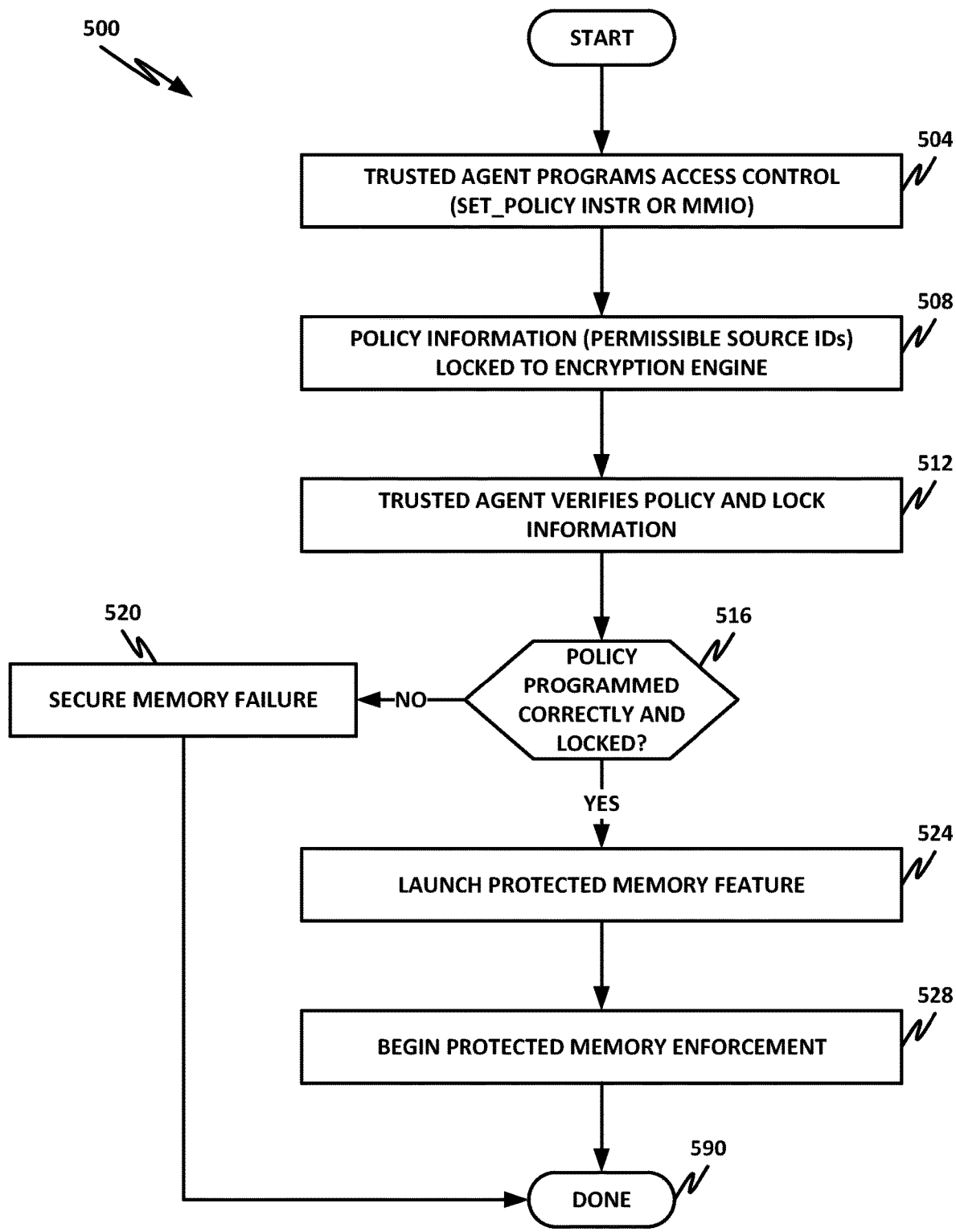
FIG. 5 is a flowchart of a method of setting a memory access policy.

FIG. 5 is a flowchart of a method 500 of setting a memory access policy. By way of example, a trusted agent for a particular range may program the access control policy corresponding to that range. This can be done either through the MMIO or through the SET_POLICY instruction, depending on what agents are in the trusted compute base (TCB) of a range. As an example, for PRMRR, because BIOS and the operating system/virtual memory monitor are outside the trust boundary, the access policy may need to be programmed through the SET_POLICY instruction. However, in other embodiments, the instruction could be replaced instead with model specific registers (MSRs). For a range like SMRR or IMRs, where the BIOS is within the trust boundary, the range may be set up by the BIOS through MMIO or via the SET_POLICY instruction.

The SET_POLICY instruction can be executed by software as follows:

SET_POLICY policy_value

The parameter policy_value may be a bit vector of source IDs that are allowed access to the corresponding range. In some embodiments, a unique source ID is associated with each of the memory traffic sources. However, in one embodiment, several sources can be combined to have a single source ID if their security roles are deemed to be equivalent. In this example, the source ID is actually a group source ID rather than an individual source ID.

Referring to method 500, starting in block 504, a trusted agent as described above programs the access control policy for a memory region. As described above, depending on the context, this could be programmed via the SET_POLICY instruction, via MMIO, or via direct programming of registers.

In block 508, the policy information, including the permissible source ID or IDs, is locked to the encryption engine. Once the IDs are locked, they cannot be unlocked or altered by untrusted sources.

In block 512, the trusted agent verifies the policy and the lock information to ensure that the lock occurred correctly. As part of the programming, the SET_POLICY instruction or the MMIO locks the register to prevent any further modification from any entity. In the case of ranges where software is not trusted to program the access policy correctly, a trusted agent reads the corresponding access registers to verify that the policy was set up correctly. If not, the trusted agent can fail the feature launch. For example, for SGX, the instruction MCHECK can check the access policy register set up by the BIOS and fail SGX launch if the policy is not as expected.

Thus, in decision block 516, the system checks to determine whether the policy was programmed correctly and locked. If the program was not programmed correctly and locked, then in block 520, the secure programming feature fails. In response to the failure, the system may be reset, a remedial action may be taken, there may be a notification to a security administrator, or other appropriate action may be taken. In block 590, the method is done.

Returning to decision block 516, if the policy was programmed correctly and locked, then in block 524, the system launches the protected memory feature as desired.

In block 528, the system begins enforcing the protected memory feature. One embodiment of enforcement is illustrated in method 600 of FIG. 6.

Figure 6:
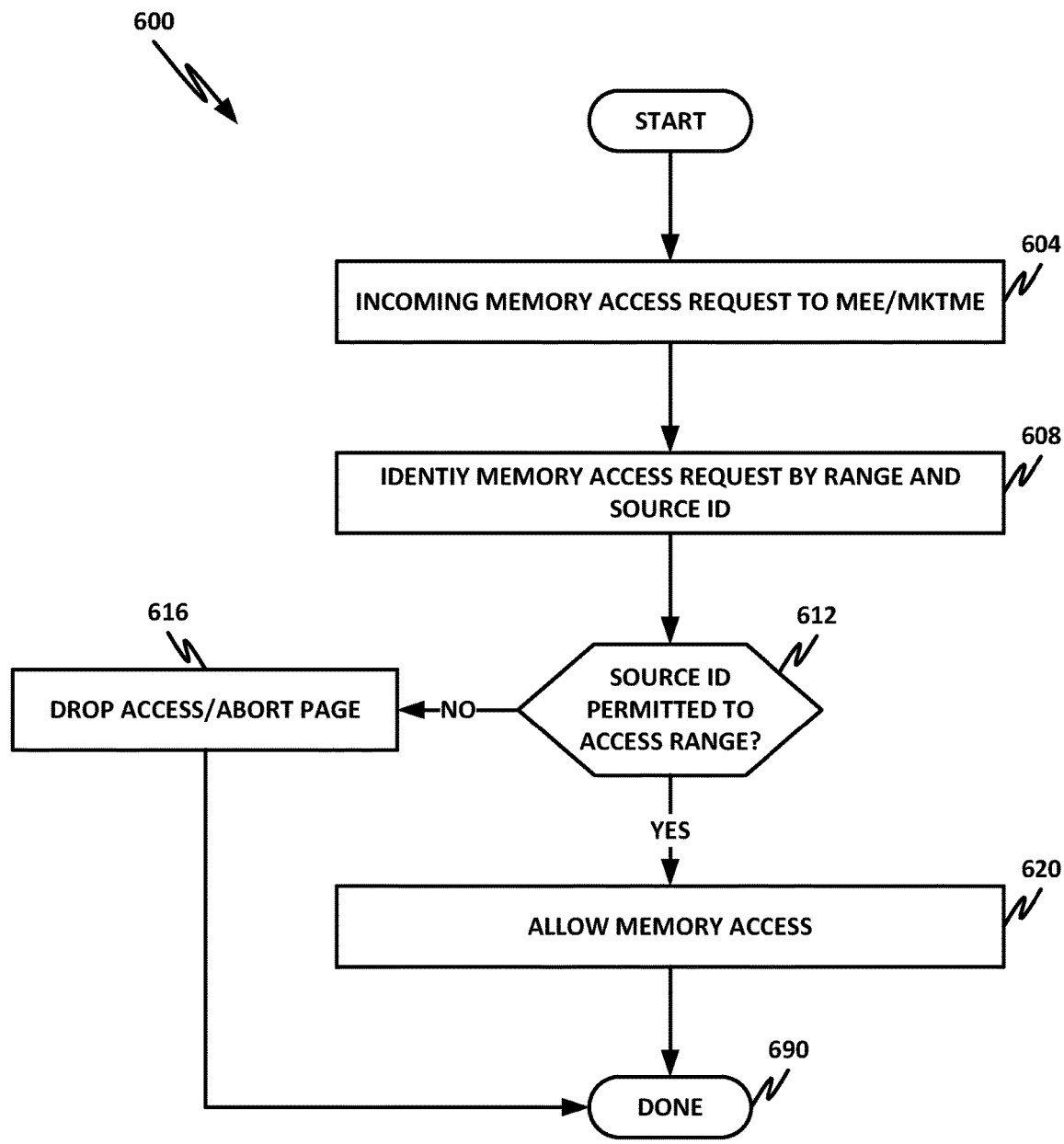
FIG. 6 is a flowchart of a method of enforcing a memory access policy.

FIG. 6 is a flowchart of a method 600 of enforcing a memory access policy.

Starting in block 604, there is an incoming memory access request to the MEE or MKTME.

At block 608, on the incoming requested encryption engine, range classification logic may identify if the incoming access belongs to a particular range. For example, if the memory access is within the range of an IMR, it needs to be handled by the memory access policy enforcement module. If it does not belong to this range, then it can be handed off to the memory controller and handled normally.

Assuming that the access belongs to the specified range, then in block 608, the MEE identifies the memory access request by both the memory address range and a source ID. The MEE may then query an associated policy register to determine if the source that originated the memory access is allowed to access that range.

In decision block 612, the system determines whether the source ID is permitted to access the range. If the source ID is not permitted to access the range, then in block 616, the memory access request is dropped, and/or there is an abort page operation. As described above, in the case of such an error, appropriate remedial or security action may be taken. In some cases, the attempted read returns a fixed pattern on a read request, while for a write request, the request is simply dropped.

Returning to decision block 612, if the source ID associated with the transaction is allowed to access the range, then in block 620, the memory access operation is allowed. The access operation is then sent to the memory controller to complete the request.

In block 690, the method is done.

Certain of the FIGURES below detail example architectures and systems to implement embodiments of the above. In some embodiments, one or more hardware components and/or instructions described above are emulated as detailed below, or implemented as software modules.

In certain examples, instruction(s) may be embodied in a "generic vector-friendly instruction format," which is detailed below. In other embodiments, another instruction format is used. The description below of the write mask registers, various data transformations (swizzle, broadcast, etc.), addressing, etc. is generally applicable to the description of the embodiments of the instruction(s) above. Additionally, example systems, architectures, and pipelines are detailed below. Embodiments of the instruction(s) above may be executed on those systems, architectures, and pipelines, but are not limited to those detailed.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are fewer fields included) and/or defined to have a given field interpreted differently. Thus, each instruction of an ISA is expressed using a given instruction format (and, if defined, in a given one of the instruction templates of that instruction format) and includes fields for specifying the operation and the operands.

In one embodiment, an example ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

A set of SIMD extensions referred to as the advanced vector extensions (AVXs) (AVX1 and AVX2), and using the vector extensions (VEX) coding scheme has been released and/or published (e.g., see Intel® 64 and IA-32 Architectures Software Developer's Manual, September 2014; and see Intel® Advanced Vector Extensions Programming Reference, October 2014).

Example Instruction Formats

Embodiments of the instruction(s) described herein may be embodied in different formats. Additionally, example systems, architectures, and pipelines are detailed below. Embodiments of the instruction(s) may be executed on such systems, architectures, and pipelines, but are not limited to those detailed.

Generic Vector-Friendly Instruction Format

A vector-friendly instruction format is an instruction format that is suited for vector instructions (e.g., there are certain fields specific to vector operations). While embodiments are described in which both vector and scalar operations are supported through the vector-friendly instruction format, alternative embodiments use only vector operations through the vector-friendly instruction format.

Figure 7B:
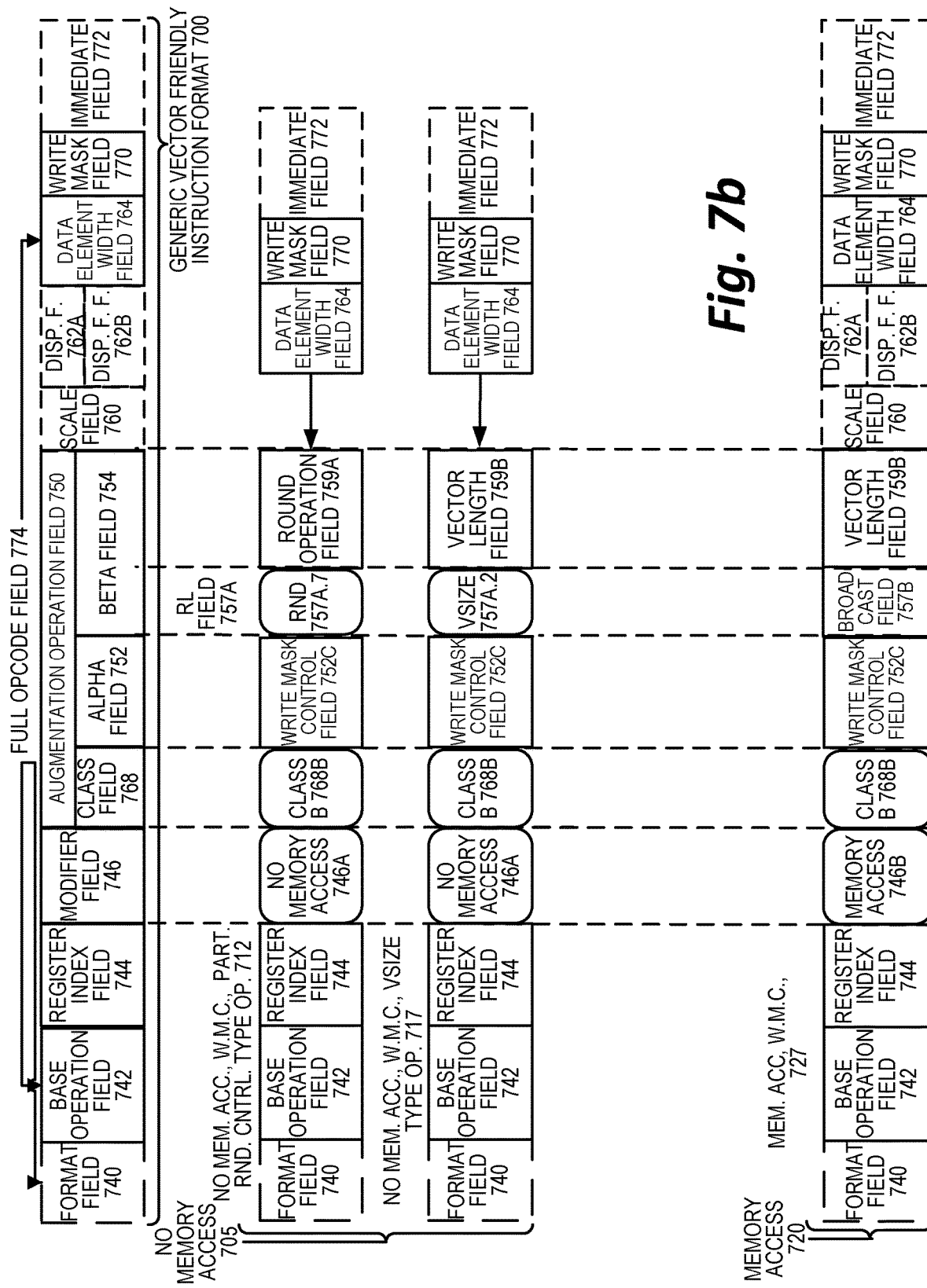

FIGS. 7a-7b are block diagrams illustrating a generic vector-friendly instruction format and instruction templates thereof according to embodiments of the specification. The vector-friendly instruction format and instruction templates of FIGS. 7a-7b may be configured or adapted to provide a device ID for memory protection, as disclosed in the present specification.

FIG. 7a is a block diagram illustrating a generic vector-friendly instruction format and class A instruction templates thereof according to embodiments of the specification; while FIG. 7b is a block diagram illustrating the generic vector-friendly instruction format and class B instruction templates thereof according to embodiments of the specification.

Specifically, a generic vector-friendly instruction format 700 for which are defined class A and class B instruction templates, both of which include no memory access 705 instruction templates and memory access 720 instruction templates. The term generic in the context of the vector-friendly instruction format refers to the instruction format not being tied to any specific instruction set.

Embodiments of the specification will be described in which the vector-friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 7a include: 1) within the no memory access 705 instruction templates there is shown a no memory access, full round control type operation 710 instruction template and a no memory access, data transform type operation 715 instruction template; and 2) within the memory access 720 instruction templates there is shown a memory access, temporal 725 instruction template and a memory access, nontemporal 730 instruction template.

The class B instruction templates in FIG. 7b include: 1) within the no memory access 705 instruction templates there is shown a no memory access, write mask control, partial round control type operation 712 instruction template and a no memory access, write mask control, VSIZE type operation 717 instruction template; and 2) within the memory access 720 instruction templates there is shown a memory access, write mask control 727 instruction template.

The generic vector-friendly instruction format 700 includes the following fields listed below in the order illustrated in FIGS. 7a-7b.

Format field 740—a specific value (an instruction format identifier value) in this field uniquely identifies the vector-friendly instruction format, and thus occurrences of instructions in the vector-friendly instruction format in instruction streams. As such, this field is optional in the sense that it is not needed for an instruction set that has only the generic vector-friendly instruction format.

Base operation field 742—its content distinguishes different base operations.

Register index field 744—its content, directly or through address generation, specifies the locations of the source and destination operands, be they in registers or in memory. These include a sufficient number of bits to select N registers from a PxQ (e.g. 32x512, 16x128, 32x1024, 64x1024) register file. While in one embodiment N may be up to three sources and one destination register, alternative embodiments may support more or fewer sources and destination registers (e.g., may support up to two sources where one of these sources also acts as the destination, may support up to three sources where one of these sources also acts as the destination, or may support up to two sources and one destination).

Modifier field 746—its content distinguishes occurrences of instructions in the generic vector instruction format that specify memory access from those that do not; that is, between no memory access 705 instruction templates and memory access 720 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, fewer, or different ways to perform memory address calculations.

Augmentation operation field 750—its content distinguishes which one of a variety of different operations to be performed in addition to the base operation. This field is context specific. In one embodiment of the specification, this field is divided into a class field 768, an alpha field 752, and a beta field 754. The augmentation operation field 750 allows common groups of operations to be performed in a single instruction rather than two, three, or four instructions.

Scale field 760—its content allows for the scaling of the index field's content for memory address generation (e.g., for address generation that uses $2^{scale}*\text{index}+\text{base}$).

Displacement Field 762A—its content is used as part of memory address generation (e.g., for address generation that uses $2^{scale}*\text{index}+\text{base}+\text{displacement}$).

Displacement Factor Field 762B (note that the juxtaposition of displacement field 762A directly over displacement factor field 762B indicates one or the other is used)—its content is used as part of address generation; it specifies a displacement factor that is to be scaled by the size of a memory access (N)—where N is the number of bytes in the memory access (e.g., for address generation that uses $2^{scale}*\text{index}+\text{base}+\text{scaled displacement}$). Redundant low-order bits are ignored and hence, the displacement factor field's content is multiplied by the memory operand's total size (N) in order to generate the final displacement to be used in calculating an effective address. The value of N is determined by the processor hardware at runtime based on the full opcode field 774 (described later herein) and the data manipulation field 754C. The displacement field 762A and the displacement factor field 762B are optional in the sense that they are not used for the no memory access 705 instruction templates and/or different embodiments may implement only one or none of the two.

Data element width field 764—its content distinguishes which one of a number of data element widths is to be used (in some embodiments, for all instructions; in other embodiments, for only some of the instructions). This field is optional in the sense that it is not needed if only one data element width is supported and/or data element widths are supported using some aspect of the opcodes.

Write mask field 770—its content controls, on a per data element position basis, whether that data element position in the destination vector operand reflects the result of the base operation and augmentation operation. Class A instruction templates support merging-write masking, while class B instruction templates support both merging and zeroing-write masking. When merging, vector masks allow any set of elements in the destination to be protected from updates during the execution of any operation (specified by the base operation and the augmentation operation)—in one embodiment, preserving the old value of each element of the destination where the corresponding mask bit has a 0. In contrast, when zeroing vector masks allow any set of elements in the destination to be zeroed during the execution of any operation (specified by the base operation and the augmentation operation), in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 770 allows for partial vector operations, including loads, stores, arithmetic, logical, etc. While embodiments of the specification are described in which the write mask field's 770 content selects one of a number of write mask registers that contains the write mask to be used (and thus the write mask field's 770 content indirectly identifies that masking to be performed), alternative embodiments instead or additionally allow the mask write field's 770 content to directly specify the masking to be performed.

Immediate field 772—its content allows for the specification of an immediate. This field is optional in the sense that is it not present in an implementation of the generic vector-friendly format that does not support immediate and it is not present in instructions that do not use an immediate.

Class field 768—its content distinguishes between different classes of instructions. With reference to FIGS. 7a-7b, the contents of this field select between class A and class B instructions. In FIGS. 7a-7b, rounded corner squares are used to indicate a specific value is present in a field (e.g., class A 768A and class B 768B for the class field 768 respectively in FIGS. 7a-7b).

Instruction Templates of Class A

In the case of the non-memory access 705 instruction templates of class A, the alpha field 752 is interpreted as an RS field 752A, whose content distinguishes which one of the different augmentation operation types are to be performed (e.g., round 752A.1 and data transform 752A.2 are respectively specified for the no memory access, round type operation 710 and the no memory access, data transform type operation 715 instruction templates), while the beta field 754 distinguishes which of the operations of the specified type is to be performed.

In the no memory access 705 instruction templates, the scale field 760, the displacement field 762A, and the displacement scale filed 762B are not present.

No Memory Access Instruction Templates—Full Round Control Type Operation

In the no memory access full round control type operation 710 instruction template, the beta field 754 is interpreted as a round control field 754A, whose content provides static rounding. While in the described embodiments of the specification the round control field 754A includes a suppress all floating point exceptions (SAE) field 756 and a round operation control field 758, alternative embodiments may encode both these concepts into the same field or only have one or the other of these concepts/fields (e.g., may have only the round operation control field 758).

SAE field 756—its content distinguishes whether or not to disable the exception event reporting; when the SAE field's 756 content indicates suppression is enabled, a given instruction does not report any kind of floating point exception flag and does not raise any floating point exception handler.

Round operation control field 758—its content distinguishes which one of a group of rounding operations to perform (e.g., round-up, round-down, round-towards-zero and round-to-nearest). Thus, the round operation control field 758 allows for the changing of the rounding mode on a per instruction basis. In one embodiment of the specification where a processor includes a control register for specifying rounding modes, the round operation control field's 750 content overrides that register value.

No Memory Access Instruction Templates—Data Transform Type Operation

In the no memory access data transform type operation 715 instruction template, the beta field 754 is interpreted as a data transform field 754B, whose content distinguishes which one of a number of data transforms is to be performed (e.g., no data transform, swizzle, broadcast).

In the case of a memory access 720 instruction template of class A, the alpha field 752 is interpreted as an eviction hint field 752B, whose content distinguishes which one of the eviction hints is to be used (in FIG. 7a, temporal 752B.1 and nontemporal 752B.2 are respectively specified for the memory access, temporal 725 instruction template and the memory access, nontemporal 730 instruction template), while the beta field 754 is interpreted as a data manipulation field 754C, whose content distinguishes which one of a number of data manipulation operations (also known as primitives) is to be performed (e.g., no manipulation; broadcast; up conversion of a source; and down conversion of a destination). The memory access 720 instruction templates include the scale field 760, and optionally the displacement field 762A or the displacement scale field 762B.

Vector memory instructions perform vector loads from and vector stores to memory, with conversion support. As with regular vector instructions, vector memory instructions transfer data from/to memory in a data element-wise fashion, with the elements that are actually transferred as dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Nontemporal

Nontemporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 752 is interpreted as a write mask control (Z) field 752C, whose content distinguishes whether the write masking controlled by the write mask field 770 should be a merging or a zeroing.

In the case of the non-memory access 705 instruction templates of class B, part of the beta field 754 is interpreted as an RL field 757A, whose content distinguishes which one of the different augmentation operation types are to be performed (e.g., round 757A.1 and vector length (VSIZE) 757A.2 are respectively specified for the no memory access, write mask control, partial round control type operation 712 instruction template and the no memory access, write mask control, VSIZE type operation 717 instruction template), while the rest of the beta field 754 distinguishes which of the operations of the specified type is to be performed. In the no memory access 705 instruction templates, the scale field 760, the displacement field 762A, and the displacement scale field 762B are not present.

In the no memory access, write mask control, partial round control type operation 710 instruction template, the rest of the beta field 754 is interpreted as a round operation field 759A and exception event reporting is disabled (a given instruction does not report any kind of floating point exception flag and does not raise any floating point exception handler).

Round operation control field 759A—just as round operation control field 758, its content distinguishes which one of a group of rounding operations to perform (e.g., round-up, round-down, round-towards-zero and round-to-nearest). Thus, the round operation control field 759A allows for the changing of the rounding mode on a per instruction basis. In one embodiment of the specification where a processor includes a control register for specifying rounding modes, the round operation control field's 750 content overrides that register value.

In the no memory access, write mask control, VSIZE type operation 717 instruction template, the rest of the beta field 754 is interpreted as a vector length field 759B, whose content distinguishes which one of a number of data vector lengths is to be performed on (e.g., 128, 256, or 512 byte).

In the case of a memory access 720 instruction template of class B, part of the beta field 754 is interpreted as a broadcast field 757B, whose content distinguishes whether or not the broadcast type data manipulation operation is to be performed, while the rest of the beta field 754 is interpreted by the vector length field 759B. The memory access 720 instruction templates include the scale field 760, and optionally the displacement field 762A or the displacement scale field 762B.

With regard to the generic vector-friendly instruction format 700, a full opcode field 774 is shown including the format field 740, the base operation field 742, and the data element width field 764. While one embodiment is shown where the full opcode field 774 includes all of these fields, the full opcode field 774 includes less than all of these fields in embodiments that do not support all of them. The full opcode field 774 provides the operation code (opcode).

The augmentation operation field 750, the data element width field 764, and the write mask field 770 allow these features to be specified on a per instruction basis in the generic vector-friendly instruction format.

The combination of write mask field and data element width field create typed instructions in that they allow the mask to be applied based on different data element widths.

The various instruction templates found within class A and class B are beneficial in different situations. In some embodiments of the specification, different processors or different cores within a processor may support only class A, only class B, or both classes. For instance, a high performance general purpose out-of-order core intended for general purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the specification). Also, a single processor may include multiple cores, all of which support the same class or in which different cores support different classes. For instance, in a processor with separate graphics and general purpose cores, one of the graphics cores intended primarily for graphics and/or scientific computing may support only class A, while one or more of the general purpose cores may be high performance general purpose cores with out-of-order execution and register renaming intended for general purpose computing that supports only class B. Another processor that does not have a separate graphics core may include one more general purpose in-order or out-of-order cores that support both class A and class B. Of course, features from one class may also be implemented in the other class in different embodiments of the specification. Programs written in a high level language would be put (e.g., just in time compiled or statically compiled) into an variety of different executable forms, including: 1) a form having only instructions of the class or classes supported by the target processor for execution; or 2) a form having alternative routines written using different combinations of the instructions of all classes and having control flow code that selects the routines to execute based on the instructions supported by the processor which is currently executing the code.

Example Specific Vector-Friendly Instruction Format

FIGS. 8a-8d are block diagrams illustrating an example specific vector-friendly instruction format according to one or more examples of the present specification. The vector-friendly instruction format of FIGS. 8a-8d may be configured or adapted to provide a device ID for memory protection, as disclosed in the present specification.

Figure 8A:
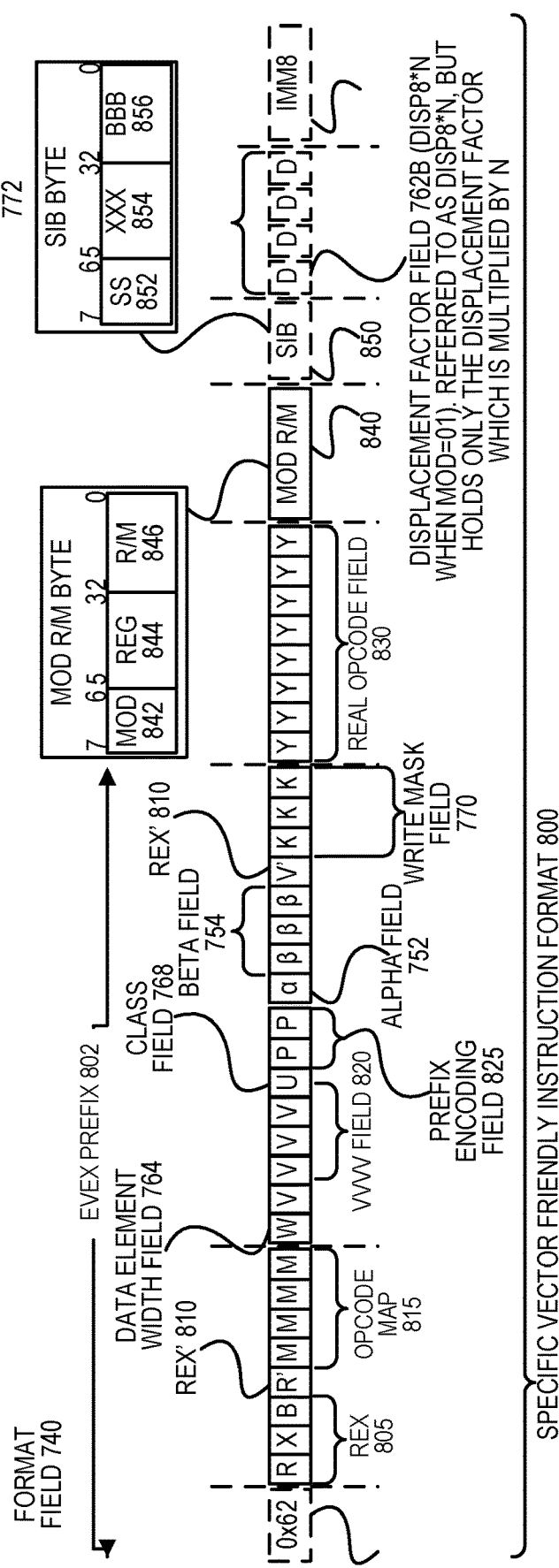
FIGS. 8a-8d are block diagrams illustrating an example specific vector-friendly instruction format according to one or more examples of the present specification.

FIG. 8a shows a specific vector-friendly instruction format 800 that is specific in the sense that it specifies the location, size, interpretation, and order of the fields, as well as values for some of those fields. The specific vector-friendly instruction format 800 may be used to extend the x86 instruction set, and thus some of the fields are similar or the same as those used in the existing x86 instruction set and extension thereof (e.g., AVX). This format remains consistent with the prefix encoding field, real opcode byte field, MOD RIM field, Scale/Index/Base (SIB) field, displacement field, and immediate fields of the existing x86 instruction set with extensions. The fields from FIGS. 7a and 7b into which the fields from FIG. 8a map are illustrated.

It should be understood that, although embodiments of the specification are described with reference to the specific vector-friendly instruction format 800 in the context of the generic vector-friendly instruction format 700 for illustrative purposes, the present specification is not limited to the specific vector-friendly instruction format 800 except where claimed. For example, the generic vector-friendly instruction format 700 contemplates a variety of possible sizes for the various fields, while the specific vector-friendly instruction format 800 is shown as having fields of specific sizes. By way of particular example, while the data element width field 764 is illustrated as a one bit field in the specific vector-friendly instruction format 800, the present specification is not so limited (that is, the generic vector-friendly instruction format 700 contemplates other sizes of the data element width field 764).

The generic vector-friendly instruction format 700 includes the following fields listed below in the order illustrated in FIG. 8a.

EVEX Prefix (Bytes 0-3) 802—is encoded in a four-byte form.

Format Field 740 (EVEX Byte 0, bits [7:0])—the first byte (EVEX Byte 0) is the format field 740 and it contains 0x62 (the unique value used for distinguishing the vector-friendly instruction format in one embodiment).

The second through fourth bytes (EVEX Bytes 1-3) include a number of bit fields providing specific capability.

REX field 805 (EVEX Byte 1, bits [7-5])—consists of an EVEX.R bit field (EVEX Byte 1, bit [7]—R), EVEX.X bit field (EVEX byte 1, bit [6]—X), and 757 BEX byte 1, bit[5]—B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 710—this is the first part of the REX' field 710 and is the EVEX.R' bit field (EVEX Byte 1, bit [4]—R') that is used to encode either the upper 16 or lower 16 of the extended 32 register set. In one embodiment, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; other embodiments do not store this and the other indicated bits below in the inverted format. A value of 1 is used to encode the lower 16 registers.

In other words, R'Rrrr is formed by combining EVEX.R', EVEX.R, and the other RRR from other fields.

Opcode map field 815 (EVEX byte 1, bits [3:0]—mmmm)—its content encodes an implied leading opcode byte (0F, 0F 38, or 0F 3).

Data element width field 764 (EVEX byte 2, bit [7]—W)—is represented by the notation EVEX.W. EVEX.W is used to define the granularity (size) of the datatype (either 32-bit data elements or 64-bit data elements).

EVEX.vvvv 820 (EVEX Byte 2, bits [6:3]—vvvv)—the role of EVEX.vvvv may include the following: 1) EVEX.vvvv encodes the first source register operand, specified in inverted (1s complement) form and is valid for instructions with two or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 820 encodes the four low-order bits of the first source register specifier stored in inverted (1s complement) form. Depending on the instruction, an extra different EVEX bit field is used to extend the specifier size to 32 registers.

EVEX.U 768 Class field (EVEX byte 2, bit [2]—U)—if EVEX.U=0, it indicates class A or EVEX.U0; if EVEX.U=1, it indicates class B or EVEX.U1.

Prefix encoding field 825 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only two bits). In one embodiment, to support legacy SSE instructions that use an SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's programmable logic array (PLA) (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 752 (EVEX byte 3, bit [7]—EH; Eviction Hint (EH); also known as EVEX.eh, EVEX.rs, EVEX.rl, EVEX.write mask control, and EVEX.n; also illustrated with a)—as previously described, this field is context specific.

Beta field 754 (EVEX byte 3, bits [6:4]—SSS, also known as EVEX.s$_{2-0}$, EVEX.r$_{2-0}$, EVEX.rr1, EVEX.LL0, EVEX.LLB; also illustrated with βββ)—as previously described, this field is context specific.

REX' field 710—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 770 (EVEX byte 3, bits [2:0]-kkk)—its content specifies the index of a register in the write mask registers as previously described. In one embodiment, the specific value EVEX.kkk=000 has a special behavior implying no write mask is used for the particular instruction (this may be implemented in a variety of ways including the use of a write mask hardwired to all ones or hardware that bypasses the masking hardware).

Real opcode field 830 (Byte 4) is also known as the opcode byte. Part of the opcode is specified in this field.

MOD R/M Field 840 (Byte 5) includes MOD field 842, Reg field 844, and R/M field 846. As previously described, the MOD field's 842 content distinguishes between memory access and non-memory access operations. The role of Reg field 844 can be summarized to two situations: encoding either the destination register operand or a source register operand, or be treated as an opcode extension and not used to encode any instruction operand. The role of RIM field 846 may include the following: encoding the instruction operand that references a memory address, or encoding either the destination register operand or a source register operand.

SIB Byte (Byte 6)—as previously described, the scale field's 750 content is used for memory address generation. SIB.xxx 854 and SIB.bbb 856—the contents of these fields have been previously referred to with regard to the register indexes Xxxx and Bbbb.

Displacement field 762A (Bytes 7-10)—when MOD field 842 contains 10, bytes 7-10 are the displacement field 762A, and it works the same as the legacy 32-bit displacement (disp32) and works at byte granularity.

Displacement factor field 762B (Byte 7)—when MOD field 842 contains 01, byte 7 is the displacement factor field 762B. The location of this field is the same as that of the legacy x86 instruction set 8-bit displacement (disp8), which works at byte granularity. Since disp8 is sign extended, it can only address between 128 and 127-byte offsets; in terms of 64 byte cache lines, disp8 uses eight bits that can be set to only four really useful values −128, −64, 0, and 64; since a greater range is often needed, disp32 is used; however, disp32 requires 4 bytes. In contrast to disp8 and disp32, the displacement factor field 762B is a reinterpretation of disp8; when using displacement factor field 762B, the actual displacement is determined by the content of the displacement factor field multiplied by the size of the memory operand access (N). This type of displacement is referred to as disp8*N. This reduces the average instruction length (a single byte used for the displacement but with a much greater range). Such compressed displacement is based on the assumption that the effective displacement is a multiple of the granularity of the memory access, and hence, the redundant low-order bits of the address offset do not need to be encoded. In other words, the displacement factor field 762B substitutes the legacy x86 instruction set 8-bit displacement. Thus, the displacement factor field 762B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 772 operates as previously described.

Full Opcode Field

Figure 8B:
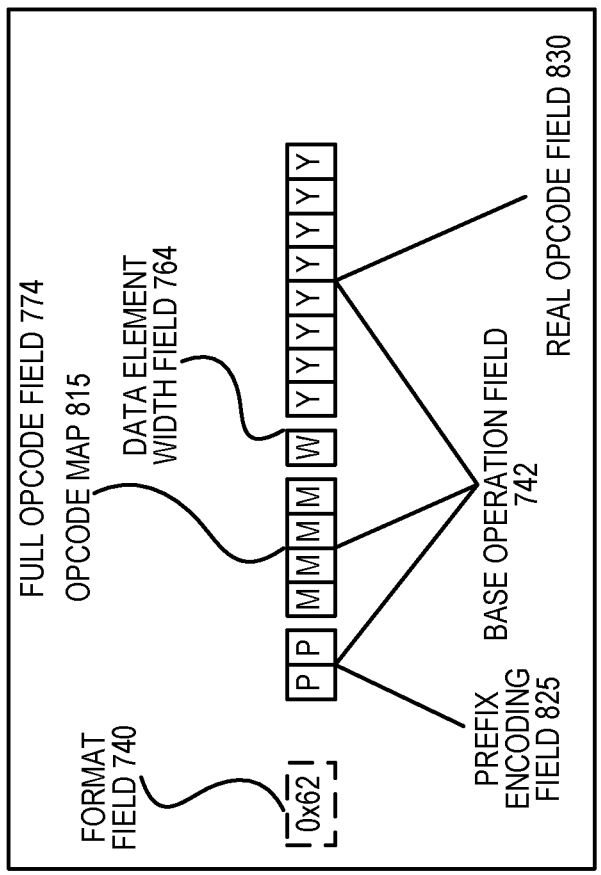

FIG. 8*b* is a block diagram illustrating the fields of the specific vector-friendly instruction format 800 that make up the full opcode field 774 according to one embodiment. Specifically, the full opcode field 774 includes the format field 740, the base operation field 742, and the data element width (W) field 764. The base operation field 742 includes the prefix encoding field 825, the opcode map field 815, and the real opcode field 830.

Register Index Field

Figure 8C:
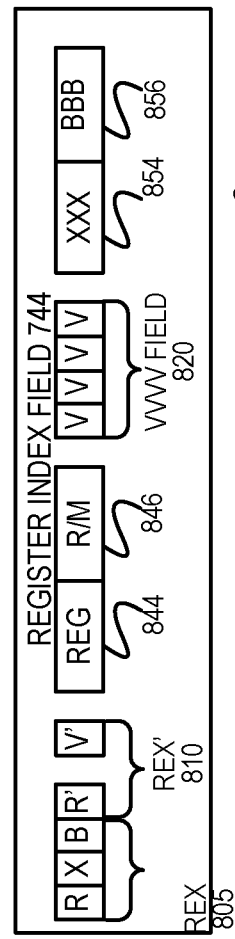

FIG. 8c is a block diagram illustrating the fields of the specific vector-friendly instruction format 800 that make up the register index field 744 according to one embodiment.

Specifically, the register index field 744 includes the REX field 805, the REX' field 810, the MODR/M.reg field 844, the MODR/M.r/m field 846, the VVVV field 820, xxx field 854, and the bbb field 856.

Augmentation Operation Field

Figure 8D:
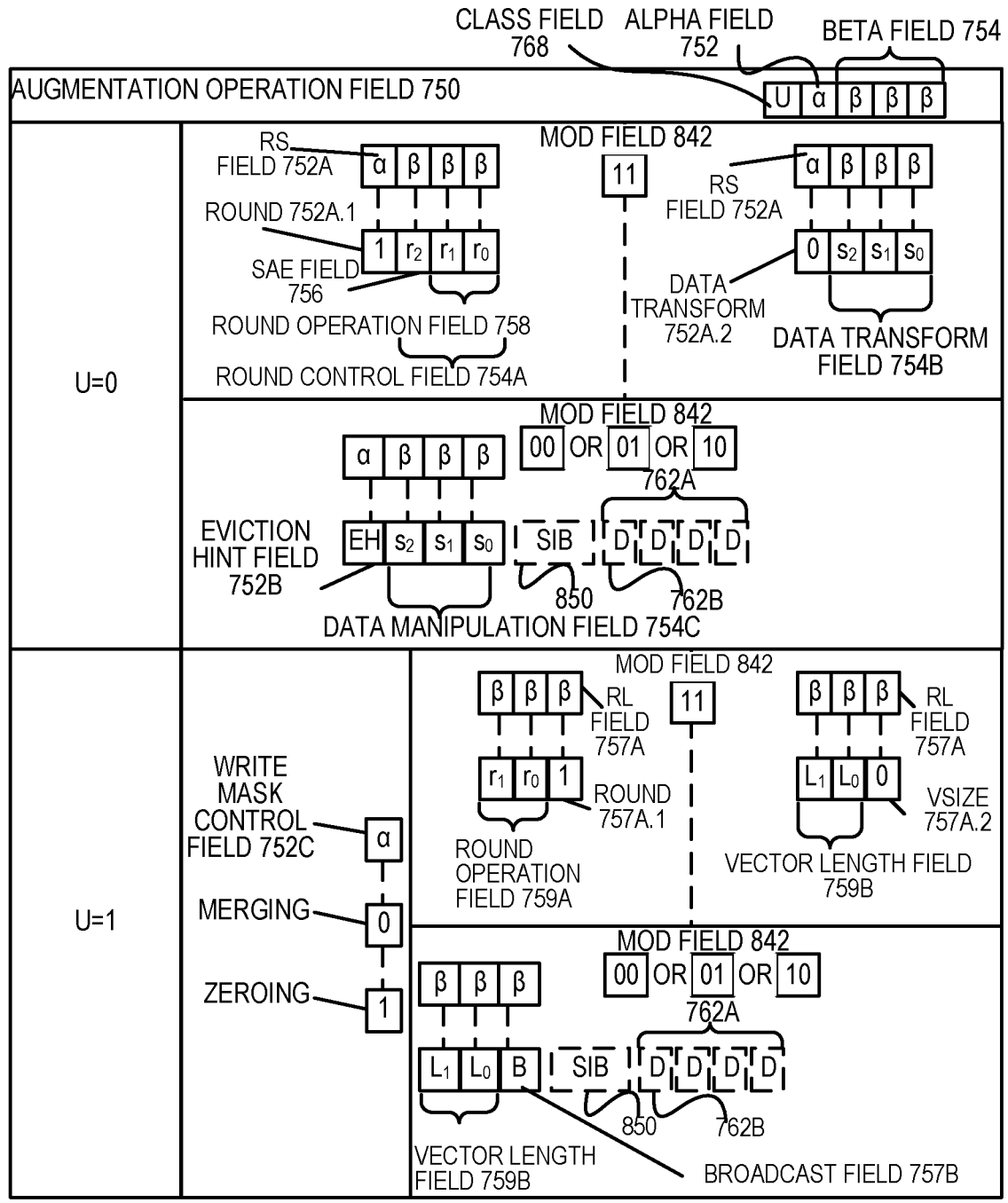

FIG. 8d is a block diagram illustrating the fields of the specific vector-friendly instruction format 800 that make up the augmentation operation field 750 according to one embodiment.

When the class (U) field 768 contains 0, it signifies EVEX.U0 (class A 768A); when it contains 1, it signifies EVEX.U1 (class B 768B). When U=0 and the MOD field 842 contains 11 (signifying a no memory access operation), the alpha field 752 (EVEX byte 3, bit [7]—EH) is interpreted as the rs field 752A.

When the rs field 752A contains a 1 (round 752A.1), the beta field 754 (EVEX byte 3, bits [6:4]—SSS) is interpreted as the round control field 754A. The round control field 754A includes a one bit SAE field 756 and a two bit round operation field 758. When the rs field 752A contains a 0 (data transform 752A.2), the beta field 754 (EVEX byte 3, bits [6:4]—SSS) is interpreted as a three bit data transform field 754B.

When U=0 and the MOD field 842 contains 00, 01, or 10 (signifying a memory access operation), the alpha field 752 (EVEX byte 3, bit [7]—EH) is interpreted as the EH field 752B and the beta field 754 (EVEX byte 3, bits [6:4]—SSS) is interpreted as a three bit data manipulation field 754C.

When U=1, the alpha field 752 (EVEX byte 3, bit [7]—EH) is interpreted as the write mask control (Z) field 752C. When U=1 and the MOD field 842 contains 11 (signifying a no memory access operation), part of the beta field 754 (EVEX byte 3, bit [4]—S$_0$) is interpreted as the RL field 757A; when it contains a 1 (round 757A.1) the rest of the beta field 754 (EVEX byte 3, bit [6-5]—S$_{2-1}$) is interpreted as the round operation field 759A, while when the RL field 757A contains a 0 (VSIZE 757.A2) the rest of the beta field 754 (EVEX byte 3, bit [6-5]—S$_{2-1}$) is interpreted as the vector length field 759B (EVEX byte 3, bit [6-5]—L$_{1-0}$).

When U=1 and the MOD field 842 contains 00, 01, or 10 (signifying a memory access operation), the beta field 754 (EVEX byte 3, bits [6:4]—SSS) is interpreted as the vector length field 759B (EVEX byte 3, bit [6-5]—L$_{1-0}$) and the broadcast field 757B (EVEX byte 3, bit [4]—B).

Example Register Architecture

Figure 9:
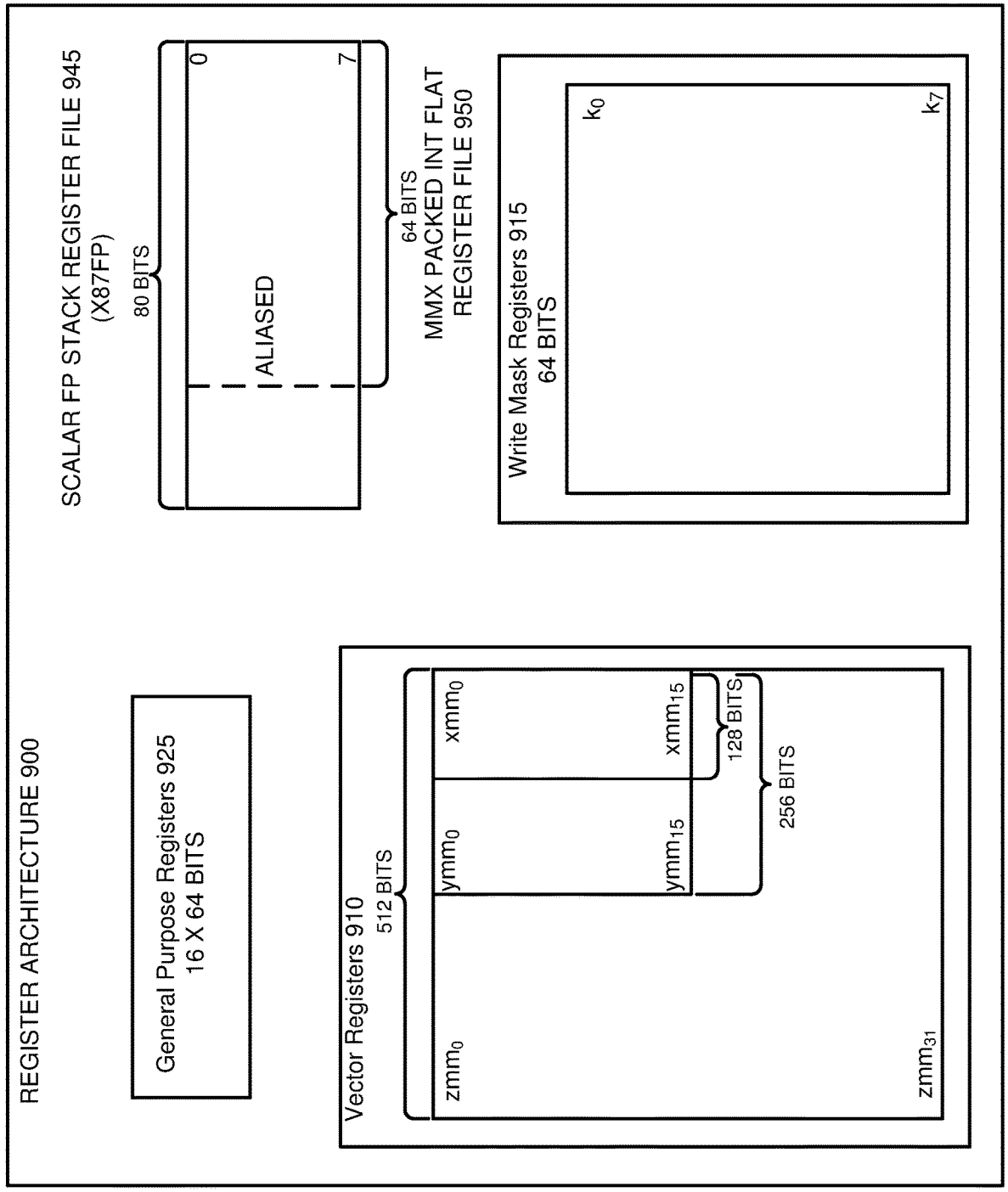
FIG. 9 is a block diagram of a register architecture according to one or more examples of the present specification.

FIG. 9 is a block diagram of a register architecture 900 according to one embodiment. Register architecture 900 may be configured or adapted to provide a device ID for memory protection, as disclosed in the present specification.

In the embodiment illustrated, there are 32 vector registers 910 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector-friendly instruction format 800 operates on these overlaid register files as illustrated in the below tables.

| Adjustable Vector Length | Class | Operations | Registers |
|---|---|---|---|
| Instruction Templates that do not include the vector length field 759B | A (FIG. 7a; U = 0) | 710, 715, 725, 730 | zmm registers (the vector length is 64 byte) |
| | B (FIG. 7b; U = 1) | 712 | zmm registers (the vector length is 64 byte) |
| Instruction templates that do include the vector length field 759B | B (FIG. 7b; U = 1) | 717, 727 | zmm, ymm, or xmm registers (the vector length is 64 byte, 32 byte, or 16 byte) depending on the vector length field 759B |

In other words, the vector length field 759B selects between a maximum length and one or more other shorter lengths, where each such shorter length is half the length of the preceding length; and instruction templates without the vector length field 759B operate on the maximum vector length. Further, in one embodiment, the class B instruction templates of the specific vector-friendly instruction format 800 operate on packed or scalar single/double-precision floating point data and packed or scalar integer data. Scalar operations are operations performed on the lowest order data element position in a zmm/ymm/xmm register; the higher order data element positions are either left the same as they were prior to the instruction or zeroed depending on the embodiment.

Write mask registers 915—in the embodiment illustrated, there are eight write mask registers (k0 through k7), each 64 bits in size. In an alternate embodiment, the write mask registers 915 are 16 bits in size. As previously described, in one embodiment, the vector mask register k0 cannot be used as a write mask; when the encoding that would normally indicate k0 is used for a write mask, it selects a hardwired write mask of 0xFFFF, effectively disabling write masking for that instruction.

General purpose registers 925—in the embodiment illustrated, there are sixteen 64-bit general purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 945, on which is aliased the MMX packed integer flat register file 950—in the embodiment illustrated, the x87 stack is an eight-element stack used to perform scalar floating point operations on 32/64/80-bit floating point data using the x87 instruction set extension; while the MMX registers are used to perform operations on 64-bit packed integer data, as well as to hold operands for some operations performed between the MMX and XMM registers.

Other embodiments may use wider or narrower registers. Additionally, other embodiments may use more, less, or different register files and registers.

Example Core Architectures, Processors, and Computer Architectures

Processor cores may be implemented in different ways, for different purposes, and in different processors. For instance, implementations of such cores may include: 1) a general purpose in-order core intended for general purpose computing; 2) a high performance general purpose out-of-order core intended for general purpose computing; 3) a special-purpose core intended primarily for graphics and/or scientific (throughput) computing. Implementations of different processors may include: 1) a central processing unit (CPU) including one or more general purpose in-order cores intended for general purpose computing and/or one or more general purpose out-of-order cores intended for general purpose computing; and 2) a coprocessor including one or more special-purpose cores intended primarily for graphics and/or scientific throughput. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special-purpose logic, such as integrated graphics and/or scientific (throughput) logic, or as special-purpose cores); and 4) an SoC that may include on the same die the described CPU (sometimes referred to as the application core(s) or application processor(s)), the above described coprocessor, and additional functionality. Example core architectures are described next, followed by descriptions of example processors and computer architectures.

Example Core Architectures

In-Order and Out-of-Order Core Block Diagram

FIG. 10a is a block diagram illustrating both an example in-order pipeline and an example register renaming, out-of-order issue/execution pipeline. FIG. 10b is a block diagram illustrating both an embodiment of an in-order architecture core and an example register renaming, out-of-order issue/execution architecture core to be included in a processor. The example pipelines, register renamings, and architecture cores of FIGS. 10a-10b may be configured or adapted to provide a device ID for memory protection, as disclosed in the present specification.

The solid lined boxes in FIGS. 10a-10b illustrate the in-order pipeline and in-order core, while the optional addition of the dashed, lined boxes illustrates the register renaming, out-of-order issue/execution pipeline and core. Given that the in-order aspect is a subset of the out-of-order aspect, the out-of-order aspect will be described.

In FIG. 10a, a processor pipeline 1000 includes a fetch stage 1002, a length decode stage 1004, a decode stage 1006, an allocation stage 1008, a renaming stage 1010, a scheduling (also known as a dispatch or issue) stage 1012, a register read/memory read stage 1014, an execute stage 1016, a write back/memory write stage 1018, an exception handling stage 1022, and a commit stage 1024.

FIG. 10b shows processor core 1090 including a front end unit 1030 coupled to an execution engine unit 1050, and both are coupled to a memory unit 1070. The core 1090 may be a reduced instruction set computing (RISC) core, a complex instruction set computing (CISC) core, a very long instruction word (VLIW) core, or a hybrid or alternative core type. As yet another option, the core 1090 may be a special-purpose core, such as, for example, a network or communication core, compression engine, coprocessor core, general purpose computing graphics processing unit (GPGPU) core, graphics core, or the like.

The front end unit 1030 includes a branch prediction unit 1032 coupled to an instruction cache unit 1034, which is coupled to an instruction translation lookaside buffer (TLB) 1036, which is coupled to an instruction fetch unit 1038, which is coupled to a decode unit 1040. The decode unit 1040 (or decoder) may decode instructions, and generate as an output one or more micro-operations, microcode entry points, microinstructions, other instructions, or other control signals, which are decoded from, or which otherwise reflect, or are derived from, the original instructions. The decode unit 1040 may be implemented using various different mechanisms. Examples of suitable mechanisms include, but are not limited to, look-up tables, hardware implementations, PLAs, microcode read-only memories (ROMs), etc. In one embodiment, the core 1090 includes a microcode ROM or other medium that stores microcode for certain macroinstructions (e.g., in decode unit 1040 or otherwise within the front end unit 1030). The decode unit 1040 is coupled to a rename/allocator unit 1052 in the execution engine unit 1050.

The execution engine unit 1050 includes the rename/allocator unit 1052 coupled to a retirement unit 1054 and a set of one or more scheduler unit(s) 1056. The scheduler unit(s) 1056 represents any number of different schedulers, including reservation stations, central instruction window, etc. The scheduler unit(s) 1056 is coupled to the physical register file(s) unit(s) 1058. Each of the physical register file(s) units 1058 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1058 comprises a vector registers unit, a write mask registers unit, and a scalar registers unit. These register units may provide architectural vector registers, vector mask registers, and general purpose registers. The physical register file(s) unit(s) 1058 is overlapped by the retirement unit 1054 to illustrate various ways in which register renaming and out-of-order execution may be implemented (e.g., using a reorder buffer(s) and a retirement register file(s); using a future file(s), a history buffer(s), and a retirement register file(s); using register maps and a pool of registers; etc.). The retirement unit 1054 and the physical register file(s) unit(s) 1058 are coupled to the execution cluster(s) 1060. The execution cluster(s) 1060 includes a set of one or more execution units 1062 and a set of one or more memory access units 1064. The execution units 1062 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1056, physical register file(s) unit(s) 1058, and execution cluster(s) 1060 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1064). It should also be understood that where separate pipelines are used, one or more of these pipelines may be out-of-order issue/execution and the rest in-order.

The set of memory access units 1064 is coupled to the memory unit 1070, which includes a data TLB unit 1072 coupled to a data cache unit 1074 coupled to a level 2 (L2) cache unit 1076. In one embodiment, the memory access units 1064 may include a load unit, a store address unit, and a store data unit, each of which is coupled to the data TLB unit 1072 in the memory unit 1070. The instruction cache unit 1034 is further coupled to a level 2 (L2) cache unit 1076 in the memory unit 1070. The L2 cache unit 1076 is coupled to one or more other levels of cache and eventually to a main memory.

By way of example, the register renaming, out-of-order issue/execution core architecture may implement the pipeline 1000 as follows: 1) the instruction fetch 1038 performs the fetch and length decoding stages 1002 and 1004; 2) the decode unit 1040 performs the decode stage 1006; 3) the rename/allocator unit 1052 performs the allocation stage 1008 and renaming stage 1010; 4) the scheduler unit(s) 1056 performs the schedule stage 1012; 5) the physical register file(s) unit(s) 1058 and the memory unit 1070 perform the register read/memory read stage 1014; the execution cluster 1060 performs the execute stage 1016; 6) the memory unit 1070 and the physical register file(s) unit(s) 1058 perform the write back/memory write stage 1018; 7) various units may be involved in the exception handling stage 1022; and 8) the retirement unit 1054 and the physical register file(s) unit(s) 1058 perform the commit stage 1024.

The core 1090 may support one or more instruction sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1090 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1034/1074 and a shared L2 cache unit 1076, alternative embodiments may have a single internal cache for both instructions and data, such as, for example, a level 1 (L1) internal cache, or multiple levels of internal cache. In some embodiments, the system may include a combination of an internal cache and an external cache that is external to the core and/or the processor. Alternatively, all of the cache may be external to the core and/or the processor.

Example in-Order Core Architecture

FIGS. 11*a*-11*b* illustrate a block diagram of a more specific example in-order core architecture, which core would be one of several logic blocks (including other cores of the same type and/or different types) in a chip. The in-order core architecture of FIGS. 11*a*-11*b* may be configured or adapted to provide a device ID for memory protection, as disclosed in the present specification.

The logic blocks communicate through a high-bandwidth interconnect network (e.g., a ring network) with some fixed function logic, memory I/O interfaces, and other necessary I/O logic, depending on the application.

FIG. 11*a* is a block diagram of a single processor core, along with its connection to the on-die interconnect network 1102 and with its local subset of the Level 2 (L2) cache 1104, according to one or more embodiments. In one embodiment, an instruction decoder 1100 supports the x86 instruction set with a packed data instruction set extension. An L1 cache 1106 allows low-latency accesses to cache memory into the scalar and vector units. While in one embodiment (to simplify the design), a scalar unit 1108 and a vector unit 1110 use separate register sets (respectively, scalar registers 1112 and vector registers 1114) and data transferred between them is written to memory and then read back in from a level 1 (L1) cache 1106, other embodiments may use a different approach (e.g., use a single register set or include a communication path that allows data to be transferred between the two register files without being written and read back).

The local subset of the L2 cache 1104 is part of a global L2 cache that is divided into separate local subsets, one per processor core. Each processor core has a direct access path to its own local subset of the L2 cache 1104. Data read by a processor core is stored in its L2 cache subset 1104 and can be accessed quickly, in parallel with other processor cores accessing their own local L2 cache subsets. Data written by a processor core is stored in its own L2 cache subset 1104 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 11*b* is an expanded view of part of the processor core in FIG. 11*a* according to embodiments of the specification. FIG. 11*b* includes an L1 data cache 1106A, part of the L1 cache 1104, as well as more detail regarding the vector unit 1110 and the vector registers 1114. Specifically, the vector unit 1110 is a 16-wide vector processing unit (VPU) (see the 16-wide ALU 1128), which executes one or more of integer, single-precision float, and double-precision float instructions. The VPU supports swizzling the register inputs with swizzle unit 1120, numeric conversion with numeric convert units 1122A-B, and replication with replication unit 1124 on the memory input. Write mask registers 1126 allow predicating resulting vector writes.

Figure 12:
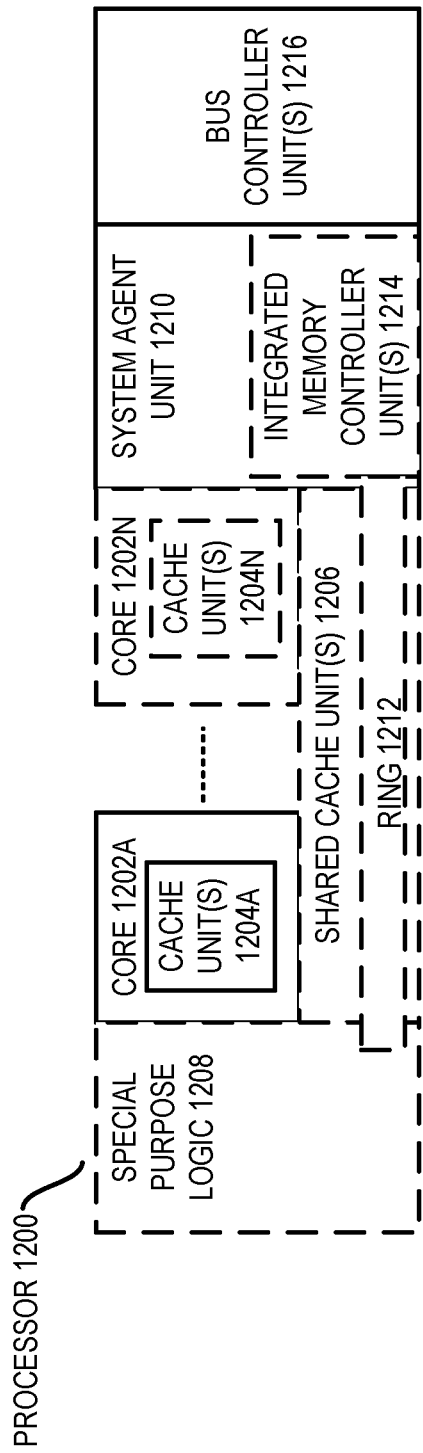
FIG. 12 is a block diagram of a processor that may have more than one core, may have an integrated memory controller, and may have integrated graphics according to one or more examples of the present specification.

FIG. 12 is a block diagram of a processor 1200 that may have more than one core, may have an integrated memory controller, and may have integrated graphics according to embodiments of the specification. Processor 1200 may be configured or adapted to provide a device ID for memory protection, as disclosed in the present specification.

The solid lined boxes in FIG. 12 illustrate a processor 1200 with a single core 1202A, a system agent 1210, a set of one or more bus controller units 1216, while the optional addition of the dashed lined boxes illustrates an alternative processor 1200 with multiple cores 1202A-N, a set of one or more integrated memory controller unit(s) 1214 in the system agent unit 1210, and special-purpose logic 1208.

Thus, different implementations of the processor 1200 may include: 1) a CPU with the special-purpose logic 1208 being integrated graphics and/or scientific (throughput) logic (which may include one or more cores), and the cores 1202A-N being one or more general purpose cores (e.g., general purpose in-order cores, general purpose out-of-order cores, a combination of the two); 2) a coprocessor with the cores 1202A-N being a large number of special-purpose cores intended primarily for graphics and/or scientific throughput; and 3) a coprocessor with the cores 1202A-N being a large number of general purpose in-order cores. Thus, the processor 1200 may be a general purpose processor, coprocessor or special-purpose processor, such as, for example, a network or communication processor, compression engine, graphics processor, GPGPU, a high-throughput many integrated core (MIC) coprocessor (including 30 or more cores), embedded processor, or the like. The processor may be implemented on one or more chips. The processor 1200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1206, and external memory (not shown) coupled to the set of integrated memory controller units 1214. The set of shared cache units 1206 may include one or more mid-level caches, such as level 2 (L2), level 3 (L3), level 4 (L4), or other levels of cache, a last level cache (LLC), and/or combinations thereof. While in one embodiment a ring based interconnect unit 1212 interconnects the integrated graphics logic 1208, the set of shared cache units 1206, and the system agent unit 1210/integrated memory controller unit(s) 1214, alternative embodiments may use any number of well-known techniques for interconnecting such units. In one embodiment, coherency is maintained between one or more cache units 1206 and cores 1202A-N.

In some embodiments, one or more of the cores 1202A-N are capable of multithreading. The system agent 1210 includes those components coordinating and operating cores 1202A-N. The system agent unit 1210 may include, for example, a power control unit (PCU) and a display unit. The PCU may be or include logic and components needed for regulating the power state of the cores 1202A-N and the integrated graphics logic 1208. The display unit is for driving one or more externally connected displays.

The cores 1202A-N may be homogenous or heterogeneous in terms of architecture instruction set; that is, two or more of the cores 1202A-N may be capable of executing the same instruction set, while others may be capable of executing only a subset of that instruction set or a different instruction set.

Example Computer Architectures

FIGS. 13-16 are block diagrams of example computer architectures. The architectures of FIGS. 13-16 may be configured or adapted to provide a device ID for memory protection, as disclosed in the present specification.

Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 13:
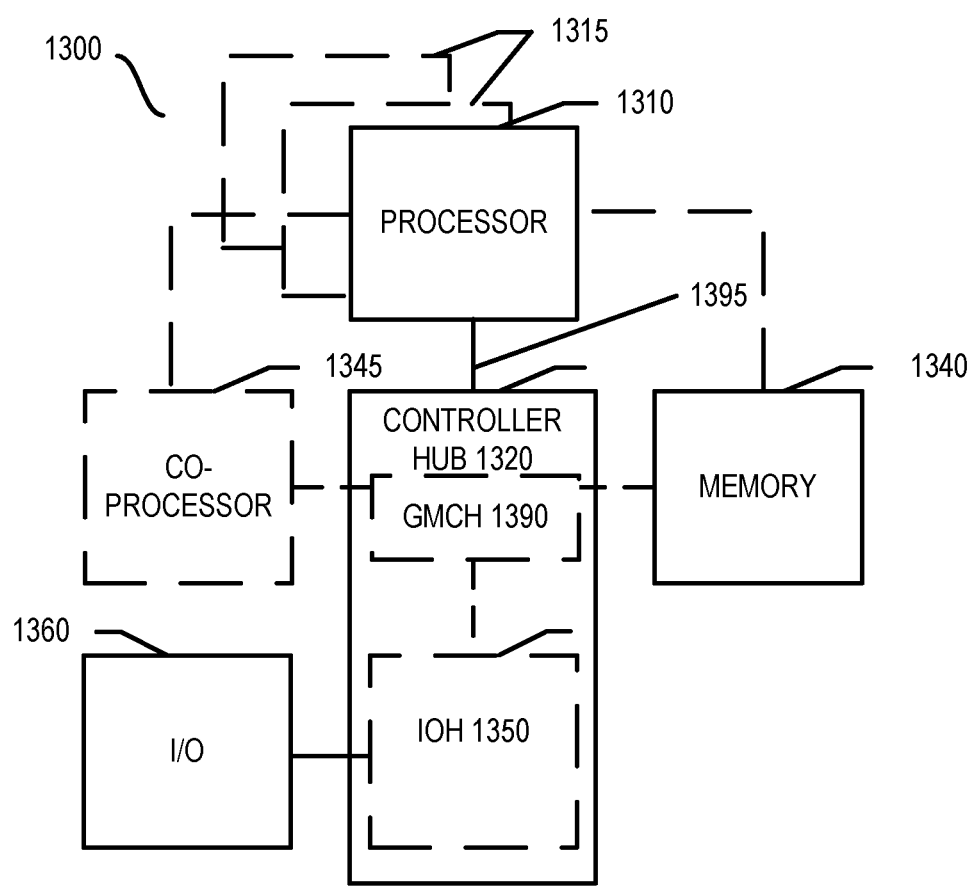
FIGS. 13-16 are block diagrams of computer architectures according to one or more examples of the present specification.

Referring now to FIG. 13, shown is a block diagram of a system 1300 in accordance with one embodiment. The system 1300 may include one or more processors 1310, 1315, which are coupled to a controller hub 1320. In one embodiment the controller hub 1320 includes a graphics memory controller hub (GMCH) 1390 and an input/output hub (IOH) 1350 (which may be on separate chips); the GMCH 1390 includes memory and graphics controllers to which are coupled memory 1340 and a coprocessor 1345; the IOH 1350 couples input/output (I/O) devices 1360 to the GMCH 1390. Alternatively, one or both of the memory and graphics controllers are integrated within the processor (as described herein), the memory 1340 and the coprocessor 1345 are coupled directly to the processor 1310, and the controller hub 1320 in a single chip with the IOH 1350.

The optional nature of additional processors 1315 is denoted in FIG. 13 with broken lines. Each processor 1310, 1315 may include one or more of the processing cores described herein and may be some version of the processor 1200.

The memory 1340 may be, for example, dynamic random access memory (DRAM), phase change memory (PCM), or a combination of the two. For at least one embodiment, the controller hub 1320 communicates with the processor(s) 1310, 1315 via a multidrop bus, such as a frontside bus (FSB), point-to-point interface such as Ultra Path Interconnect (UPI), or similar connection 1395.

In one embodiment, the coprocessor 1345 is a special-purpose processor, such as, for example, a high-throughput MIC processor, a network or communication processor, compression engine, graphics processor, GPGPU, embedded processor, or the like. In one embodiment, controller hub 1320 may include an integrated graphics accelerator.

There can be a variety of differences between the physical resources 1310, 1315 in terms of a spectrum of metrics of merit including architectural, microarchitectural, thermal, power consumption characteristics, and the like.

In one embodiment, the processor 1310 executes instructions that control data processing operations of a general type. Embedded within the instructions may be coprocessor instructions. The processor 1310 recognizes these coprocessor instructions as being of a type that should be executed by the attached coprocessor 1345. Accordingly, the processor 1310 issues these coprocessor instructions (or control signals representing coprocessor instructions) on a coprocessor bus or other interconnect, to coprocessor 1345. Coprocessor(s) 1345 accepts and executes the received coprocessor instructions.

Figure 14:
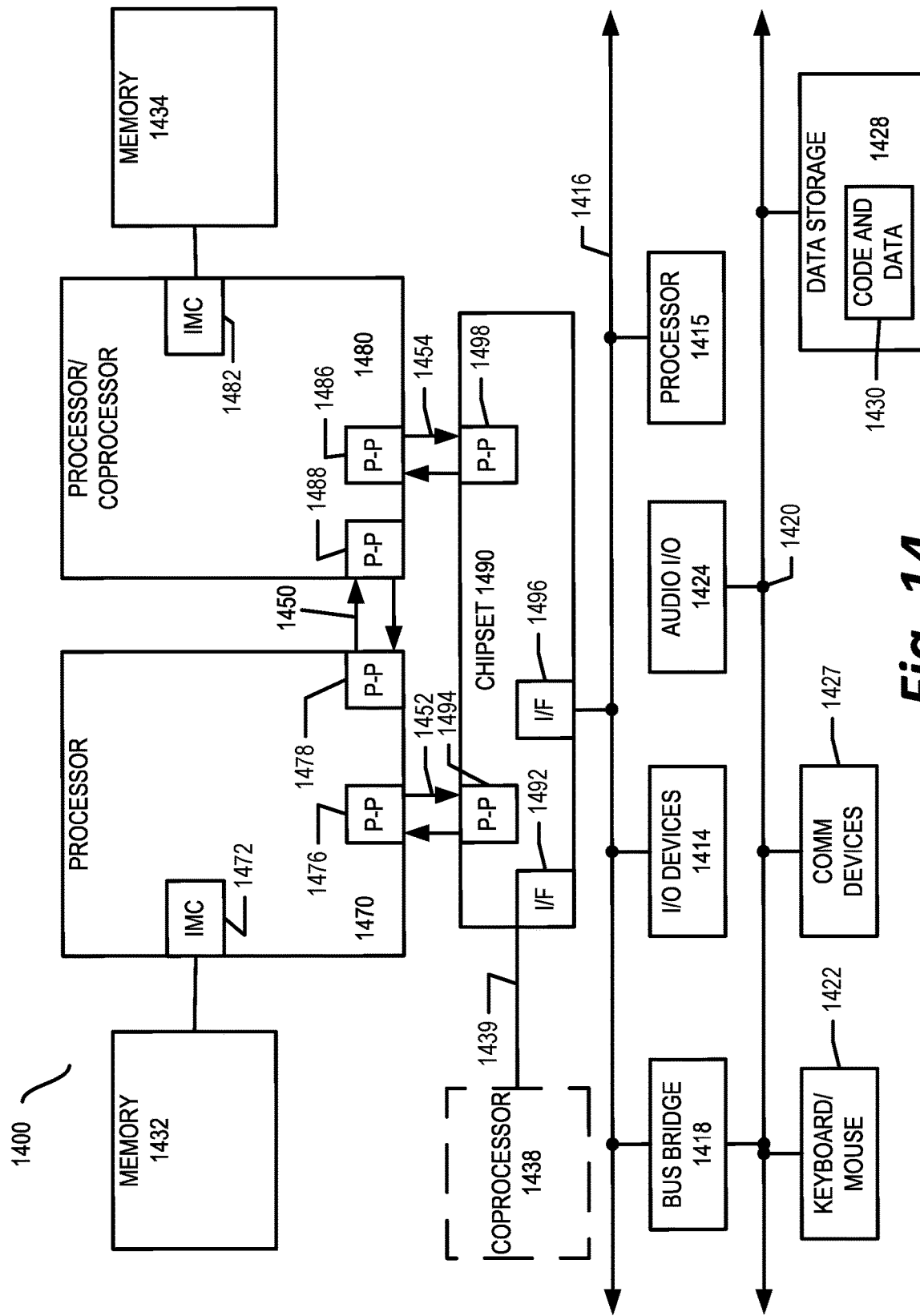

Referring now to FIG. 14, shown is a block diagram of a first more specific example system 1400. As shown in FIG. 14, multiprocessor system 1400 is a point-to-point interconnect system, and includes a first processor 1470 and a second processor 1480 coupled via a point-to-point interconnect 1450. Each of processors 1470 and 1480 may be some version of the processor 1200. In one embodiment, processors 1470 and 1480 are respectively processors 1310 and 1315, while coprocessor 1438 is coprocessor 1345. In another embodiment, processors 1470 and 1480 are respectively processor 1310 coprocessor 1345.

Processors 1470 and 1480 are shown including integrated memory controller (IMC) units 1472 and 1482, respectively. Processor 1470 also includes as part of its bus controller units point-to-point (P-P) interfaces 1476 and 1478; similarly, second processor 1480 includes P-P interfaces 1486 and 1488. Processors 1470, 1480 may exchange information via a point-to-point (P-P) interface 1450 using P-P interface circuits 1478, 1488. As shown in FIG. 14, IMCs 1472 and 1482 couple the processors to respective memories, namely a memory 1432 and a memory 1434, which may be portions of main memory locally attached to the respective processors.

Processors 1470, 1480 may each exchange information with a chipset 1490 via individual P-P interfaces 1452, 1454 using point-to-point interface circuits 1476, 1494, 1486, 1498. Chipset 1490 may optionally exchange information with the coprocessor 1438 via a high performance interface 1439. In one embodiment, the coprocessor 1438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a peripheral component interconnect (PCI) bus, or a bus such as a PCI Express bus or another third generation I/O interconnect bus, by way of nonlimiting example.

As shown in FIG. 14, various IO devices 1414 may be coupled to first bus 1416, along with a bus bridge 1418 which couples first bus 1416 to a second bus 1420. In one embodiment, one or more additional processor(s) 1415, such as coprocessors, high-throughput MIC processors, GPGPUs, accelerators (such as, e.g., graphics accelerators or DSP units), field-programmable gate arrays, or any other processor, are coupled to first bus 1416. In one embodiment, second bus 1420 may be a low pin count (LPC) bus. Various devices may be coupled to a second bus 1420 including, for example, a keyboard and/or mouse 1422, communication devices 1427 and a storage unit 1428 such as a disk drive or other mass storage device which may include instructions or code and data 1430, in one embodiment. Further, an audio IO 1424 may be coupled to the second bus 1420. Note that other architectures are possible. For example, instead of the point-to-point architecture of FIG. 14, a system may implement a multidrop bus or other such architecture.

Figure 15:
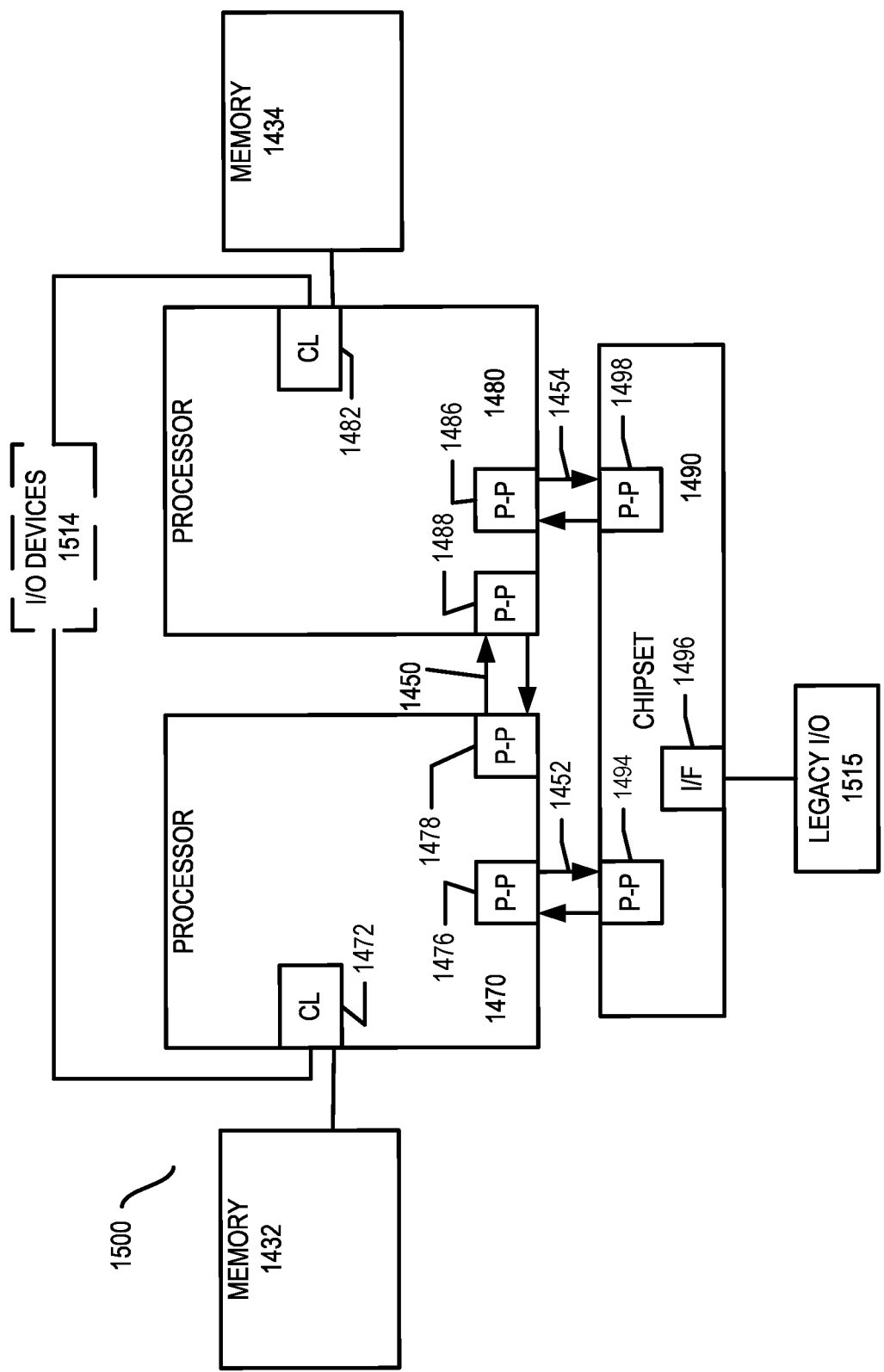

Referring now to FIG. 15, shown is a block diagram of a second more specific example system 1500. FIGS. 14 and 15 bear like reference numerals, and certain aspects of FIG. 14 have been omitted from FIG. 15 in order to avoid obscuring other aspects of FIG. 15.

FIG. 15 illustrates that the processors 1470, 1480 may include integrated memory and IO control logic ("CL") 1472 and 1482, respectively. Thus, the CL 1472, 1482 include IMC units and include IO control logic. FIG. 15 illustrates that not only are the memories 1432, 1434 coupled to the CL 1472, 1482, but also that IO devices 1514 are also coupled to the control logic 1472, 1482. Legacy IO devices 1515 are coupled to the chipset 1490.

Figure 16:
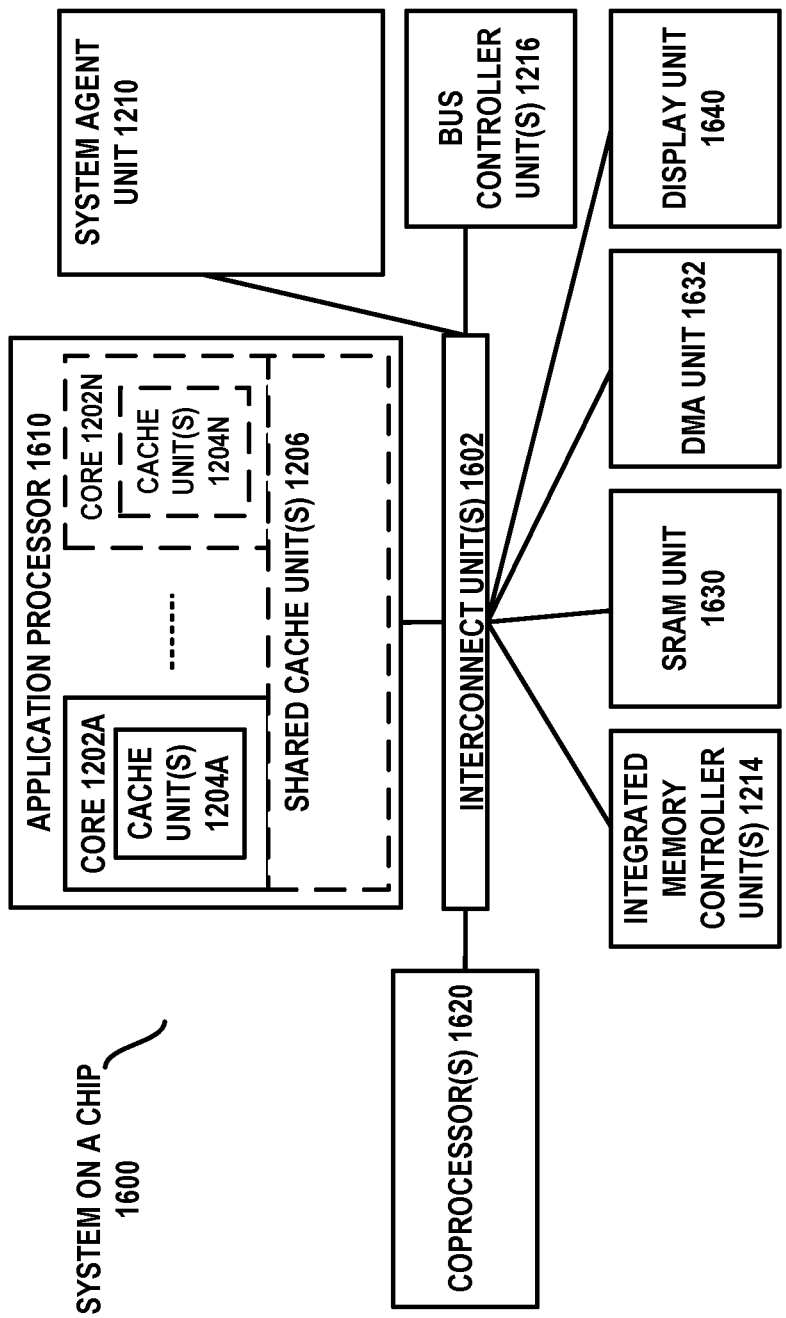

Referring now to FIG. 16, shown is a block diagram of a system-on-a-chip (SoC) 1600 in accordance with an embodiment. Similar elements in FIG. 12 bear like reference numerals. Also, dashed lined boxes are optional features on more advanced SoCs. In FIG. 16, an interconnect unit(s) 1602 is coupled to: an application processor 1610 which includes a set of one or more cores 1202A-N and shared cache unit(s) 1206; a system agent unit 1210; a bus controller unit(s) 1216; IMC unit(s) 1214; a set of one or more coprocessors 1620 which may include integrated graphics logic, an image processor, an audio processor, and a video processor; a static random access memory (SRAM) unit 1630; a direct memory access (DMA) unit 1632; and a display unit 1640 for coupling to one or more external displays. In one embodiment, the coprocessor(s) 1620 includes a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Some embodiments may be implemented as computer programs or program code executing on programmable systems comprising at least one processor, a storage system (including volatile and nonvolatile memory and/or storage elements), at least one input device, and at least one output device.

Program code, such as code 1430 illustrated in FIG. 14, may be applied to input instructions to perform the functions described herein and generate output information. The output information may be applied to one or more output devices, in known fashion. For purposes of this application, a processing system includes any system that has a processor, such as, for example, a DSP, a microcontroller, an application-specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "intellectual property (IP) cores" may be stored on a tangible, machine-readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard discs, any other type of disk including floppy disks, optical disks, compact disc read-only memories (CD-ROMs), compact disc rewritables (CD-RWs), and magneto-optical disks, semiconductor devices such as ROMs, random access memories (RAMs) such as DRAMs, SRAMs, erasable programmable read-only memories (EPROMs), flash memories, electrically erasable programmable read-only memories (EEPROMs), PCM, magnetic or optical cards, or any other type of media suitable for storing electronic instructions.

Accordingly, some embodiments also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation or dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 17:
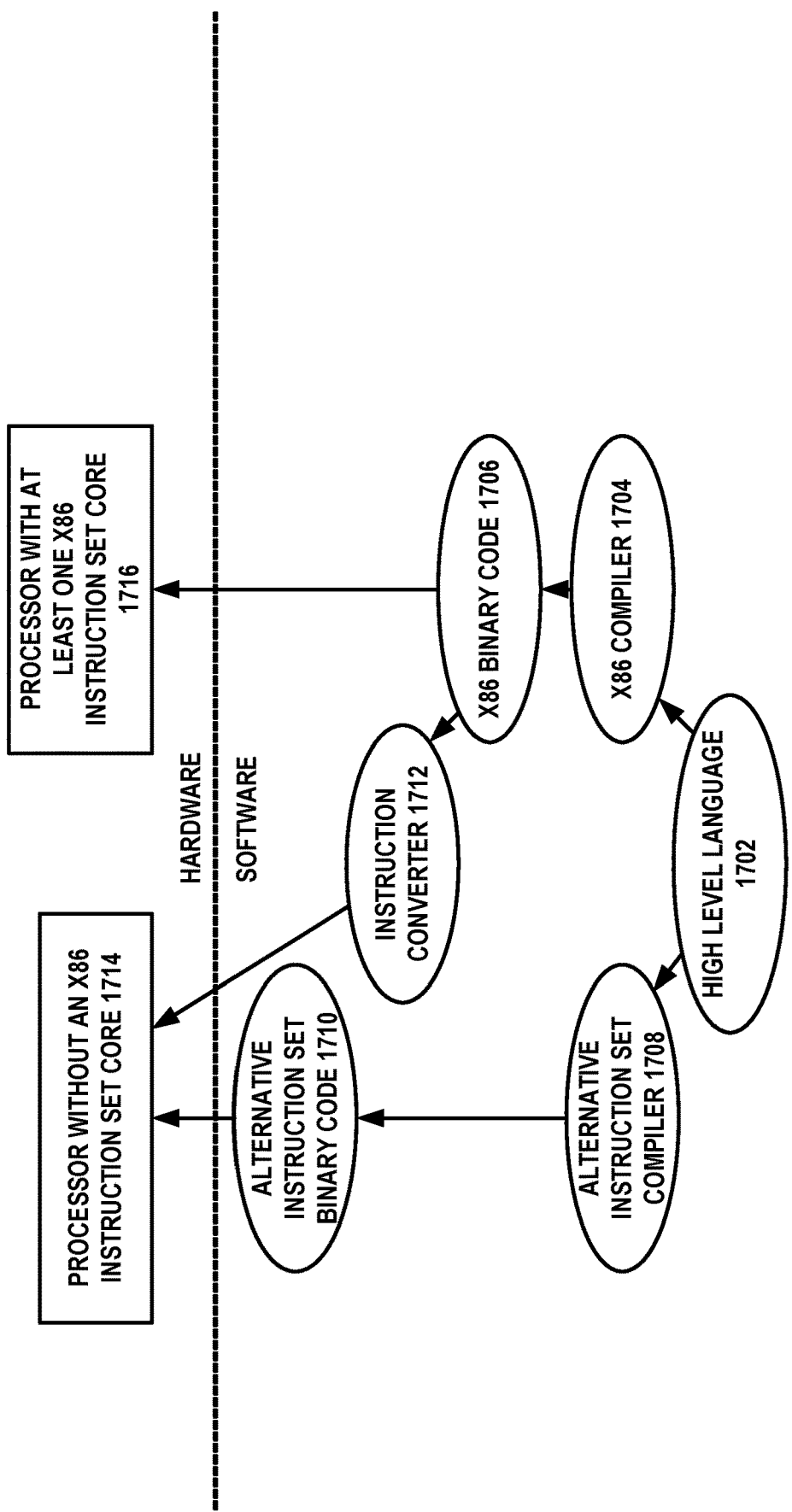
FIG. 17 is a block diagram contrasting the use of a software instruction converter to convert binary instructions in a source instruction set to binary instructions in a target instruction set according to one or more examples of the present specification.

FIG. 17 is a block diagram contrasting the use of a software instruction converter to convert binary instructions in a source instruction set to binary instructions in a target instruction set. The instruction sets of FIG. 17 may be configured or adapted to provide a device ID for memory protection, as disclosed in the present specification.

In the illustrated embodiment, the instruction converter is a software instruction converter, although alternatively the instruction converter may be implemented in software, firmware, hardware, or various combinations thereof. FIG. 17 shows a program in a high level language 1702 may be compiled using an x86 compiler 1704 to generate x86 binary code 1706 that may be natively executed by a processor with at least one x86 instruction set core 1716. The processor with at least one x86 instruction set core 1716 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 1704 represents a compiler that is operable to generate x86 binary code 1706 (e.g., object code) that can, with or without additional linkage processing, be executed on the processor with at least one x86 instruction set core 1716. Similarly, FIG. 17 shows the program in the high level language 1702 may be compiled using an alternative instruction set compiler 1708 to generate alternative instruction set binary code 1710 that may be natively executed by a processor without at least one x86 instruction set core 1714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1712 is used to convert the x86 binary code 1706 into code that may be natively executed by the processor without an x86 instruction set core 1714. This converted code is not likely to be the same as the alternative instruction set binary code 1710 because an instruction converter capable of this is difficult to make; however, the converted code will accomplish the general operation and be made up of instructions from the alternative instruction set. Thus, the instruction converter 1712 represents software, firmware, hardware, or a combination thereof that, through emulation, simulation or any other process, allows a processor or other electronic device that does not have an x86 instruction set processor or core to execute the x86 binary code 1706.

The foregoing outlines features of one or more embodiments of the subject matter disclosed herein. These embodiments are provided to enable a person having ordinary skill in the art (PHOSITA) to better understand various aspects of the present disclosure. Certain well-understood terms, as well as underlying technologies and/or standards may be referenced without being described in detail. It is anticipated that the PHOSITA will possess or have access to background knowledge or information in those technologies and standards sufficient to practice the teachings of the present specification.

The PHOSITA will appreciate that they may readily use the present disclosure as a basis for designing or modifying other processes, structures, or variations for carrying out the same purposes and/or achieving the same advantages of the embodiments introduced herein. The PHOSITA will also recognize that such equivalent constructions do not depart from the spirit and scope of the present disclosure, and that they may make various changes, substitutions, and alterations herein without departing from the spirit and scope of the present disclosure.

In the foregoing description, certain aspects of some or all embodiments are described in greater detail than is strictly necessary for practicing the appended claims. These details are provided by way of nonlimiting example only, for the purpose of providing context and illustration of the disclosed embodiments. Such details should not be understood to be required, and should not be "read into" the claims as limitations. The phrase may refer to "an embodiment" or "embodiments." These phrases, and any other references to embodiments, should be understood broadly to refer to any combination of one or more embodiments. Furthermore, the several features disclosed in a particular "embodiment" could just as well be spread across multiple embodiments. For example, if features 1 and 2 are disclosed in "an embodiment," embodiment A may have feature 1 but lack feature 2, while embodiment B may have feature 2 but lack feature 1.

This specification may provide illustrations in a block diagram format, wherein certain features are disclosed in separate blocks. These should be understood broadly to disclose how various features interoperate, but are not intended to imply that those features must necessarily be embodied in separate hardware or software. Furthermore, where a single block discloses more than one feature in the same block, those features need not necessarily be embodied in the same hardware and/or software. For example, a computer "memory" could in some circumstances be distributed or mapped between multiple levels of cache or local memory, main memory, battery-backed volatile memory, and various forms of persistent memory such as a hard disk, storage server, optical disk, tape drive, or similar. In certain embodiments, some of the components may be omitted or consolidated. In a general sense, the arrangements depicted in the FIGURES may be more logical in their representations, whereas a physical architecture may include various permutations, combinations, and/or hybrids of these elements. Countless possible design configurations can be used to achieve the operational objectives outlined herein. Accordingly, the associated infrastructure has a myriad of substitute arrangements, design choices, device possibilities, hardware configurations, software implementations, and equipment options.

References may be made herein to a computer-readable medium, which may be a tangible and non-transitory computer-readable medium. As used in this specification and throughout the claims, a "computer-readable medium" should be understood to include one or more computer-readable mediums of the same or different types. A computer-readable medium may include, by way of nonlimiting example, an optical drive (e.g., CD/DVD/Blu-Ray), a hard drive, a solid-state drive, a flash memory, or other nonvolatile medium. A computer-readable medium could also include a medium such as a ROM, a field-programmable gate array (FPGA), or ASIC configured to carry out the desired instructions, stored instructions for programming an FPGA or ASIC to carry out the desired instructions, an IP block that can be integrated in hardware into other circuits, or instructions encoded directly into hardware or microcode on a processor such as a microprocessor, DSP, microcontroller, or in any other suitable component, device, element, or object where appropriate and based on particular needs. A non-transitory storage medium herein is expressly intended to include any non-transitory special-purpose or programmable hardware configured to provide the disclosed operations, or to cause a processor to perform the disclosed operations.

Various elements may be "communicatively," "electrically," "mechanically," or otherwise "coupled" to one another throughout this specification and the claims. Such coupling may be a direct, point-to-point coupling, or may include intermediary devices. For example, two devices may be communicatively coupled to one another via a controller that facilitates the communication. Devices may be electrically coupled to one another via intermediary devices such as signal boosters, voltage dividers, or buffers. Mechanically coupled devices may be indirectly mechanically coupled.

Any "module" or "engine" disclosed herein may refer to or include software, a software stack, a combination of hardware, firmware, and/or software, a circuit configured to carry out the function of the engine or module, or any computer-readable medium as disclosed above. Such modules or engines may, in appropriate circumstances, be provided on or in conjunction with a hardware platform, which may include hardware compute resources such as a processor, memory, storage, interconnects, networks and network interfaces, accelerators, or other suitable hardware. Such a hardware platform may be provided as a single monolithic device (e.g., in a PC form factor), or with some or part of the function being distributed (e.g., a "composite node" in a high-end data center, where compute, memory, storage, and other resources may be dynamically allocated and need not be local to one another).

There may be disclosed herein flow charts, signal flow diagram, or other illustrations showing operations being performed in a particular order. Unless otherwise expressly noted, or unless required in a particular context, the order should be understood to be a nonlimiting example only. Furthermore, in cases where one operation is shown to follow another, other intervening operations may also occur, which may be related or unrelated. Some operations may also be performed simultaneously or in parallel. In cases where an operation is said to be "based on" or "according to" another item or operation, this should be understood to imply that the operation is based at least partly on or according at least partly to the other item or operation. This should not be construed to imply that the operation is based solely or exclusively on, or solely or exclusively according to the item or operation.

All or part of any hardware element disclosed herein may readily be provided in an SoC, including a CPU package. An SoC represents an integrated circuit (IC) that integrates components of a computer or other electronic system into a single chip. Thus, for example, client devices or server devices may be provided, in whole or in part, in an SoC. The SoC may contain digital, analog, mixed-signal, and radio frequency functions, all of which may be provided on a single chip substrate. Other embodiments may include a multi-chip module (MCM), with a plurality of chips located within a single electronic package and configured to interact closely with each other through the electronic package.

In a general sense, any suitably-configured circuit or processor can execute any type of instructions associated with the data to achieve the operations detailed herein. Any processor disclosed herein could transform an element or an article (for example, data) from one state or thing to another state or thing. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, should be construed as being encompassed within the broad terms "memory" and "storage," as appropriate.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. Any suitable processor and memory can be suitably coupled to the board based on particular configuration needs, processing demands, and computing designs. Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

Example Implementations

There is disclosed in one example, a computing system, comprising: a processor; a memory; and a memory encryption engine (MEE) comprising circuitry and logic to: allocate a protected isolated memory region (IMR); encrypt the protected IMR; set an access control policy to allow access to the IMR by a device identified by a device identifier; and upon receiving a memory access request directed to the IMR, enforce the access control policy.

There is further disclosed an example computing system, wherein the MEE logic is further to deny access to any device not identified by the device identifier.

There is further disclosed an example computing system, wherein the MEE logic is further to receive a plurality of device identifiers for a plurality of devices, and permit access to the IMR only to the plurality of devices.

There is further disclosed an example computing system, wherein the MEE is a multi-key total memory encryption (MKTME) engine.

There is further disclosed an example computing system, wherein the MEE is a partial scope MEE.

There is further disclosed an example computing system, wherein the processor comprises one or more access policy registers, and circuitry and logic to set the access control policy of the MEE according to the access policy registers.

There is further disclosed an example computing system, wherein the processor comprises logic to provide a SET_POLICY instruction, the SET_POLICY instruction to provide a software-accessible means for setting the access control policy.

There is further disclosed an example computing system, further comprising processor microcode to implement the SET_POLICY instruction.

There is further disclosed an example computing system, further comprising an on-die interconnect fabric between the processor and the MEE, the on-die interconnect fabric comprising dedicated device identifier bus lines.

There is further disclosed an example computing system, further comprising an uncore, and source identifier bus lines between the processor and the uncore.

There is further disclosed an example computing system, further comprising a peripheral component interconnect express (PCIe) controller, the PCIe controller comprising a device ID processor module.

There is further disclosed an example computing system, wherein the device ID processor module comprises logic to process a device ID within a transaction layer protocol (TLP) packet prefix.

There is further disclosed an example computing system, wherein the MEE comprises a memory mapped input/output (MMIO) module to provide an interface to program the memory access policy.

There is further disclosed an example computing system, wherein the MMIO module comprises logic to verify that an agent attempting to program the memory access policy is a trusted agent.

There is further disclosed an example computing system, wherein enforcing the memory access policy comprises: receiving a memory access request; determining that the memory access request is to a memory location within range of the IMR; extracting a device identifier for a device attempting the memory access request; determining that the device identifier for the device attempting to access the memory location matches the device identifier allowed to access the IMR; and allowing the memory access.

There is further disclosed an example computing system, wherein enforcing the memory access policy further comprises determining that the device identifier for the device attempting to access the memory location does not match the device identifier allowed to access the IMR, and dropping the memory access request.

There is further disclosed an example computing system, wherein the MEE comprises a memory mapped input/output (MMIO) module to provide an interface to program the memory access policy.

There is further disclosed an example computing system, wherein the MMIO module comprises logic to verify that an agent attempting to program the memory access policy is a trusted agent.

There is also disclosed an example integrated circuit, comprising: a memory encryption engine (MEE) module comprising circuitry to encrypt all or a portion of a main memory, and to identify within the encrypted memory a range of memory as an isolated memory region (IMR); a memory policy set module comprising circuitry to receive an authorized device identifier, and to associate the authorized device identifier with the IMR as a device authorized to access the IMR; and a memory policy enforcement module comprising circuitry to receive an access request directed to a memory location within the range of the IMR, including a requesting device identifier, and to allow the access request only if the requesting device identifier matches the authorized device identifier.

There is further disclosed an example integrated circuit, wherein the memory policy enforcement module further comprises circuitry to determine that the requesting device identifier does not match the authorized device identifier, and to drop the access request.

There is further disclosed an example integrated circuit, further comprising an interface to an on-chip fabric, the interconnect comprising n bus lines for receiving the requesting device identifier.

There is further disclosed an example integrated circuit, wherein n=16.

There is further disclosed an example integrated circuit, wherein n is selected from the group consisting of 2, 4, 8, 12, 16, 32, and 64.

There is further disclosed an example multi-chip module comprising the integrated circuit of a number of the above examples.

There is further disclosed an example system-on-a-chip comprising the integrated circuit of a number of the above examples.

There is further disclosed an example of one or more computer-readable mediums having stored thereon instructions and/or masks to instruct a fabricator to fabricate the integrated circuit of a number of the above examples.

There is also disclosed an example microprocessor, comprising: one or more cores; and a register file including one or more memory policy registers configured to hold a memory range for an encrypted memory region, and at least one authorized device identifier authorized to access the encrypted memory region; and logic to program a memory encryption engine (MEE) with a memory access policy according to the range for the encrypted memory region and the at least one authorized device identifier.

There is further disclosed an example microprocessor, further comprising providing a memory policy set instruction, wherein the memory policy set instruction is to receive a range of the encrypted memory region and the at least one authorized device identifier, and to program the MEE according to the range of the encrypted memory and the at least one authorized device identifier.

There is further disclosed an example microprocessor, wherein the memory policy set instruction is to receive a plurality of device identifiers authorized to access the range.

There is further disclosed an example microprocessor, wherein the memory policy set instruction is to receive a range of device identifiers authorized to access the range of encrypted memory.

There is further disclosed an example multi-chip module comprising the processor of a number of the above examples, and the MEE.

There is further disclosed an example system-on-a-chip comprising the processor of a number of the above examples, and the MEE.

There is further disclosed an example computing system comprising the processor of a number of the above examples, and the MEE.

There is also disclosed an example computing system, further comprising a peripheral component interconnect express (PCIe) controller, the PCIe controller comprising a device authorization module to receive a device identifier for a PCIe device attempting to access the memory, and to convey the device identifier for the PCIe device to the MEE.

There is further disclosed an example computing system, wherein the device authorization module is to extract the device identifier from a transaction layer protocol (TLP) packet prefix.

What is claimed is:

1. A computing system, comprising:
    a processor;
    a memory; and
    a multi-key total memory encryption (MKTME) engine, comprising circuitry to:
        allocate a protected isolated memory region (IMR);
        encrypt the protected IMR;
        set an access control policy to allow access to the IMR by a device identified by a device identifier; and
        upon receiving a memory access request directed to the IMR, enforce the access control policy.

2. The computing system of claim 1, wherein the circuitry is further to deny access to any device not identified by the device identifier.

3. The computing system of claim 1, wherein the circuitry is further to receive a plurality of device identifiers for a plurality of devices, and permit access to the IMR only to the plurality of devices.

4. The computing system of claim 1, wherein the processor comprises one or more access policy registers, and circuitry and logic to set the access control policy of the MEE according to the access policy registers.

5. The computing system of claim 1, wherein the processor comprises logic to provide a SET_POLICY instruction, the SET_POLICY instruction to provide a software-accessible means for setting the access control policy.

6. The computing system of claim 1, further comprising processor microcode to implement the SET_POLICY instruction.

7. The computing system of claim 1, further comprising an on-die interconnect fabric between the processor and the MEE, the on-die interconnect fabric comprising dedicated device identifier bus lines.

8. The computing system of claim 7, further comprising an uncore, and source identifier bus lines between the processor and the uncore.

9. The computing system of claim 1, further comprising a peripheral component interconnect express (PCIe) controller, the PCIe controller comprising a device ID processor module.

10. The computing system of claim 9, wherein the device ID processor module comprises logic to process a device ID within a transaction layer protocol (TLP) packet prefix.

11. An integrated circuit, comprising:
    a multi-key total memory encryption (MKTME) module comprising circuitry to encrypt all or a portion of a main memory, and to identify within the encrypted memory a range of memory as an isolated memory region (IMR);
    a memory policy set module comprising circuitry to receive an authorized device identifier, and to associate the authorized device identifier with the IMR as a device authorized to access the IMR; and
    a memory policy enforcement module comprising circuitry to receive an access request directed to a memory location within the range of the IMR, including a requesting device identifier, and to allow the access request only if the requesting device identifier matches the authorized device identifier.

12. The integrated circuit of claim 11, wherein the memory policy enforcement module further comprises circuitry to determine that the requesting device identifier does not match the authorized device identifier, and to drop the access request.

13. The integrated circuit of claim 11, further comprising an interface to an on-chip fabric, the interface comprising n bus lines for receiving the requesting device identifier.

14. The integrated circuit of claim 13, wherein n=16.

15. A microprocessor, comprising:
    one or more cores; and
    a register file including one or more memory policy registers configured to hold a memory range for an encrypted memory region, and at least one authorized device identifier authorized to access the encrypted memory region; and
    logic to program a multi-key total memory encryption (MKTME) engine with a memory access policy according to the range for the encrypted memory region and the at least one authorized device identifier.

16. The microprocessor of claim 15, further comprising providing a memory policy set instruction, wherein the memory policy set instruction is to receive a range of the encrypted memory region and the at least one authorized device identifier, and to program the MEE according to the range of the encrypted memory and the at least one authorized device identifier.

17. The microprocessor of claim 16, wherein the memory policy set instruction is to receive a plurality of device identifiers authorized to access the range.

18. The microprocessor of claim 16, wherein the memory policy set instruction is to receive a range of device identifiers authorized to access the range of encrypted memory.

* * * * *